(12) United States Patent
You et al.

(10) Patent No.: US 10,567,136 B2
(45) Date of Patent: Feb. 18, 2020

(54) METHOD AND USER EQUIPMENT FOR RECEIVING DOWNLINK CONTROL INFORMATION, AND METHOD AND BASE STATION FOR TRANSMITTING DOWNLINK CONTROL INFORMATION

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 16 days.

(21) Appl. No.: 15/764,154

(22) PCT Filed: Sep. 21, 2016

(86) PCT No.: PCT/KR2016/010538
§ 371 (c)(1),
(2) Date: Mar. 28, 2018

(87) PCT Pub. No.: WO2017/057870
PCT Pub. Date: Apr. 6, 2017

(65) Prior Publication Data
US 2018/0287761 A1 Oct. 4, 2018

Related U.S. Application Data

(60) Provisional application No. 62/234,615, filed on Sep. 29, 2015, provisional application No. 62/245,290, (Continued)

(51) Int. Cl.
*H04L 5/00* (2006.01)
*H04L 29/08* (2006.01)

(52) U.S. Cl.
CPC ............ *H04L 5/0053* (2013.01); *H04L 67/12* (2013.01)

(58) Field of Classification Search
None
See application file for complete search history.

(56) References Cited

U.S. PATENT DOCUMENTS

2013/0039284 A1 2/2013 Marinier et al.
2014/0355559 A1* 12/2014 Gao .................. H04W 72/1273
370/330

(Continued)

FOREIGN PATENT DOCUMENTS

EP 2806680 A1 11/2014

OTHER PUBLICATIONS

Huawei et al., "On M-PDCCH/M-EPDCCH Design in NB-LTE," 3GPP TSG GERAN#67, GP-150872, Yin Chuan, P. R. China, Aug. 10-14, 2015, pp. 1-4.

(Continued)

*Primary Examiner* — Saba Tsegaye
(74) *Attorney, Agent, or Firm* — Birch, Stewart, Kolasch & Birch, LLP

(57) ABSTRACT

A method for downlink control information (DCI) transmission/reception is provided. The method for DCI transmission comprises: receiving, by a user equipment, a narrowband physical downlink control channel (N-PDCCH) carrying the DCI. The N-PDCCH is received using at least one of two control channel element (CCEs) on the 1 resource block (RB) only. A first CCE of the two CCEs occupies 6 subcarriers of the lowest indices among the 12 subcarriers and a second CCE of the two CCEs occupies 6 subcarriers of the highest indices among the 12 subcarriers.

16 Claims, 16 Drawing Sheets

(a)

(b)

(c)

Related U.S. Application Data filed on Oct. 23, 2015, provisional application No. 62/265,402, filed on Dec. 9, 2015, provisional application No. 62/387,561, filed on Dec. 24, 2015, provisional application No. 62/276,996, filed on Jan. 11, 2016, provisional application No. 62/281,141, filed on Jan. 20, 2016.

(56) References Cited

U.S. PATENT DOCUMENTS

| | | | |
|---|---|---|---|
| 2015/0009939 A1 | 1/2015 | Zhang et al. | |
| 2016/0150545 A1* | 5/2016 | Tayloe | H04L 1/0004 370/329 |
| 2016/0226639 A1* | 8/2016 | Xiong | H04L 5/0053 |
| 2016/0226649 A1* | 8/2016 | Papasakellariou | H04L 5/0057 |
| 2017/0223725 A1* | 8/2017 | Xiong | H04L 5/0053 |
| 2019/0158264 A1* | 5/2019 | You | H04L 5/0053 |

OTHER PUBLICATIONS

Huawei, "NB-CIoT—Deployment Scenarios," 3GPP TSG RAN Meeting #69, RP-151359, Phoenix, USA, Sep. 14-16, 2015, pp. 1-9.

Qualcomm Incorporated, "New Work Item: NarrowBand IOT (NB-IOT)," 3GPP TSG RAN Meeting #69, RP-151621, Phoenix, USA, Sep. 14-16, 2015, 8 pages.

3GPP, "3rd Generation Partnership Project; Technical Specification Group Radio Access Network; Evolved Universal Terrestrial Radio Access (E-UTRA); Physical channels and modulation (Release 12)," 3GPP TS 36.211, V12.7.0, Sep. 2015 (Server Date Sep. 22, 2015), pp. 1-136, XP050996213.

Samsung, "Narrowband LTE Downlink Design (update of GP-150687)," 3GPP TSG GERAN#67, GP-150844, Yinchuan, China, Aug. 10-14, 2015, pp. 1-12, XP055369910.

\* cited by examiner

[Fig. 1]
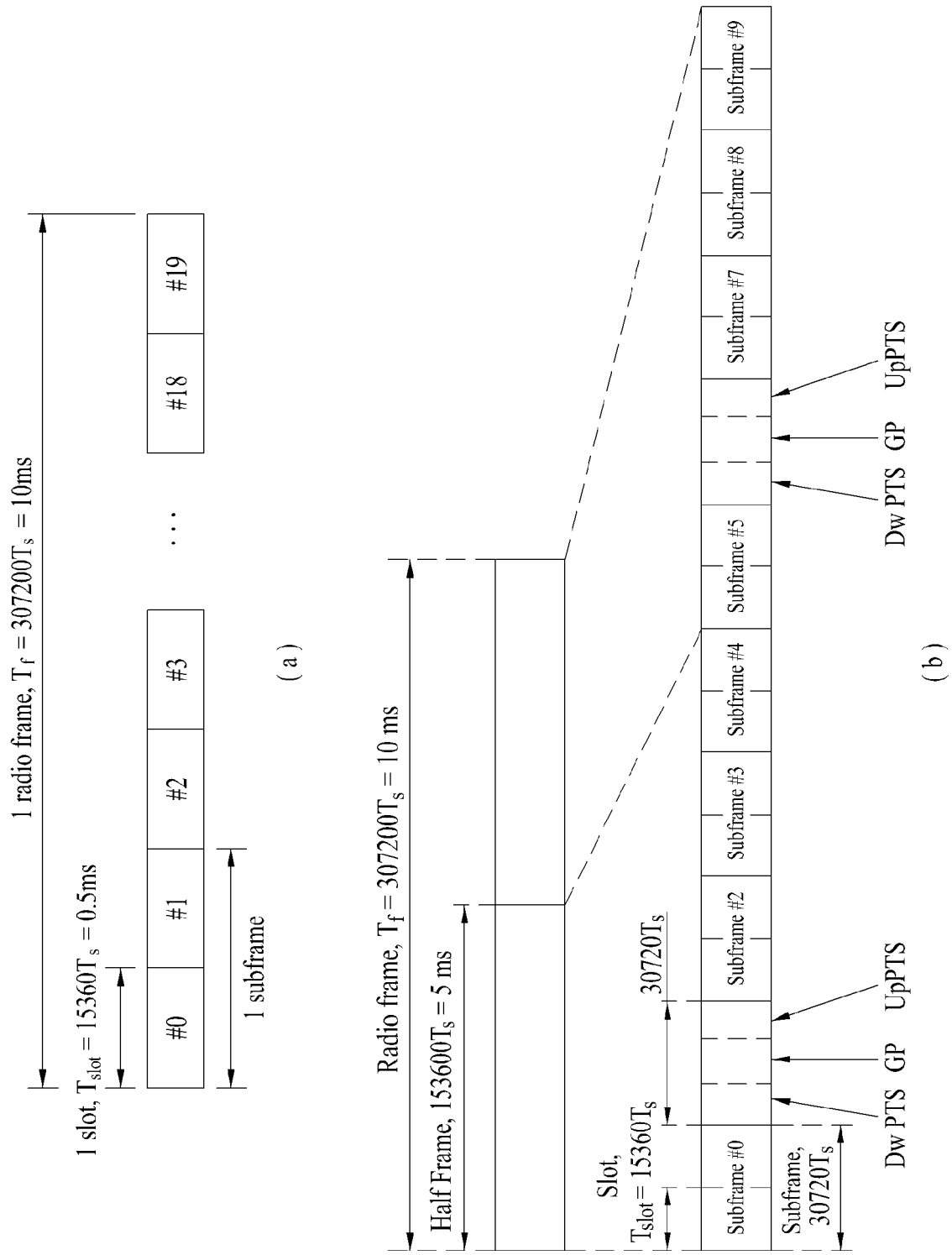

[Fig. 2]
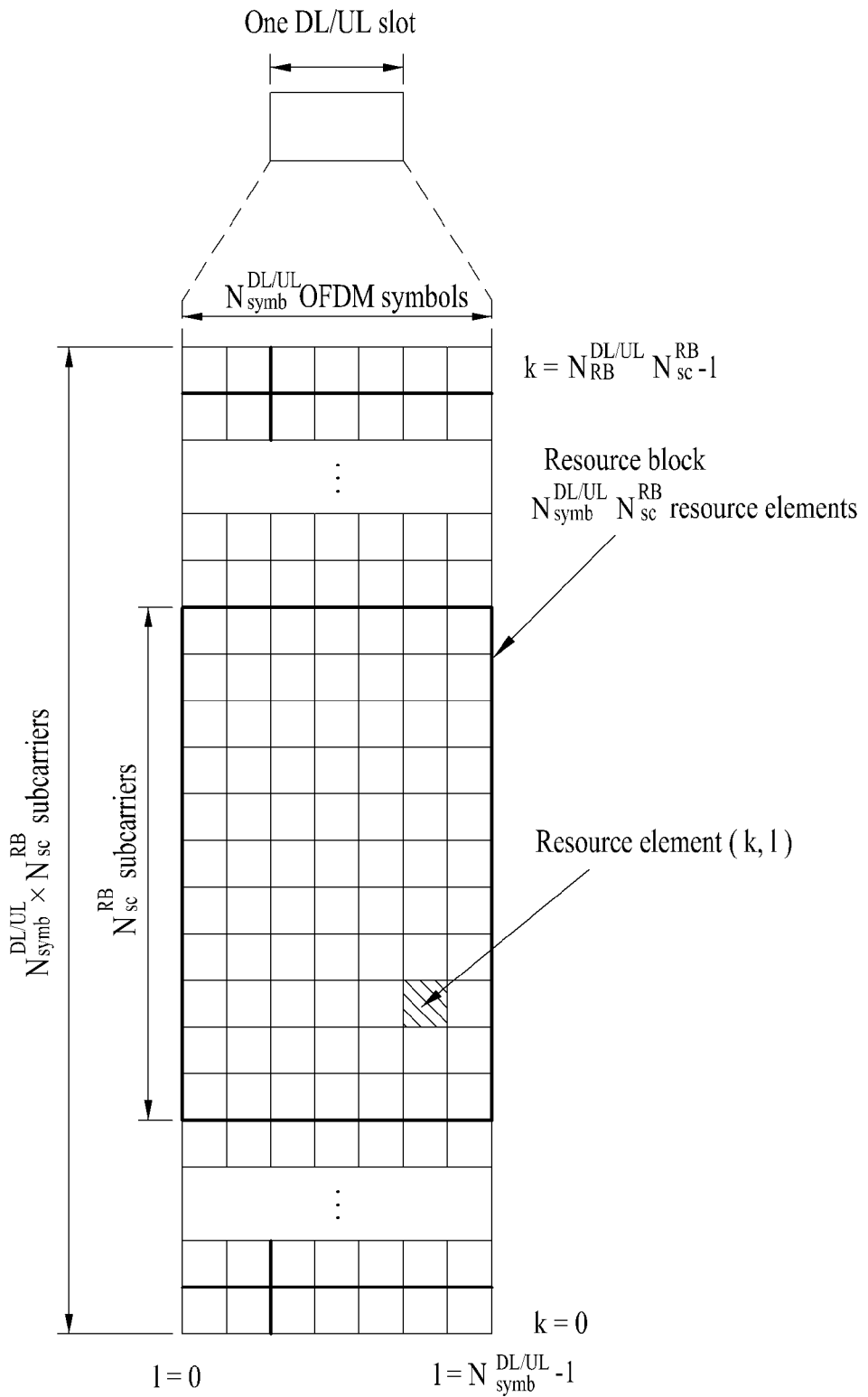

[Fig. 3]
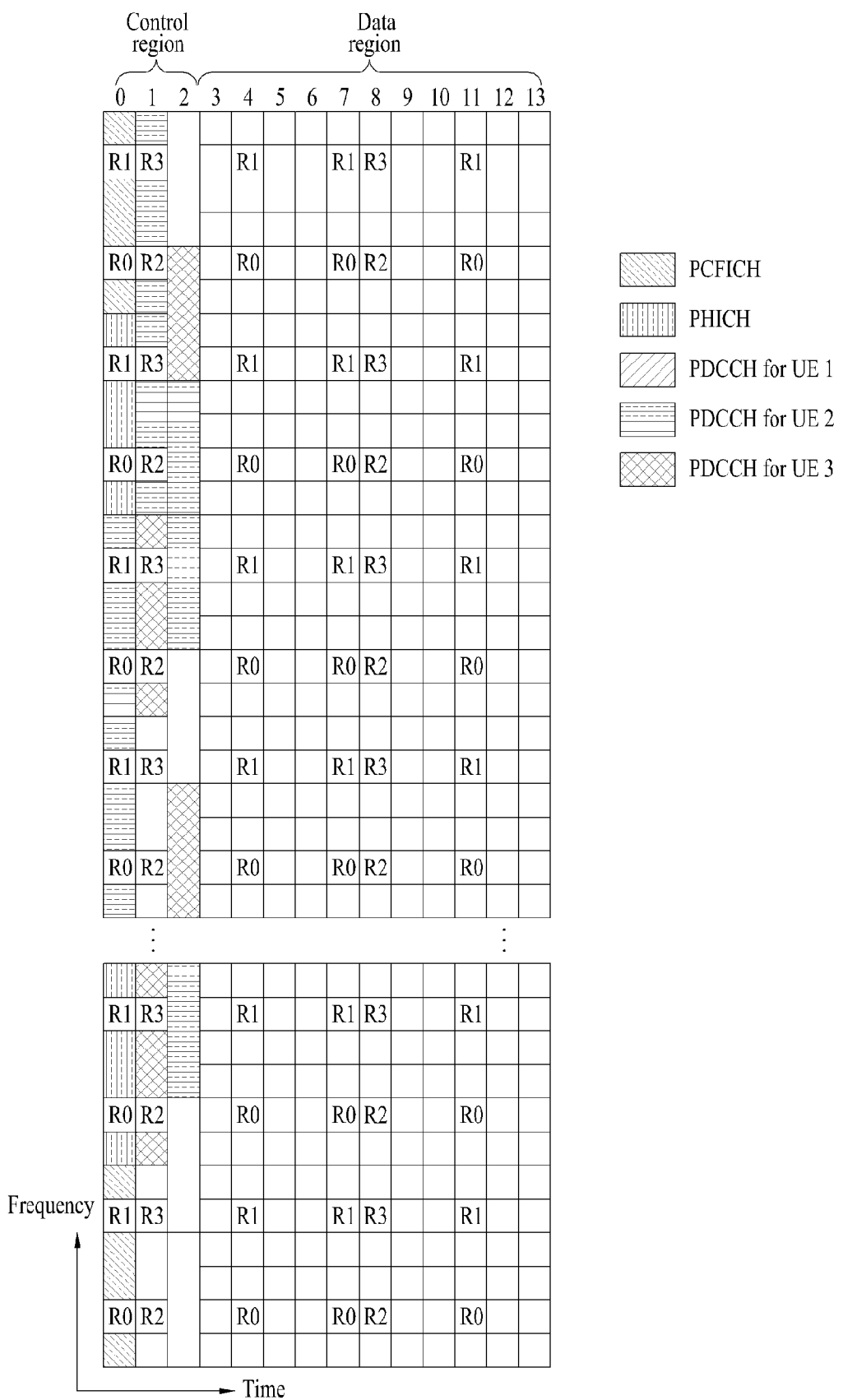

[Fig. 4]
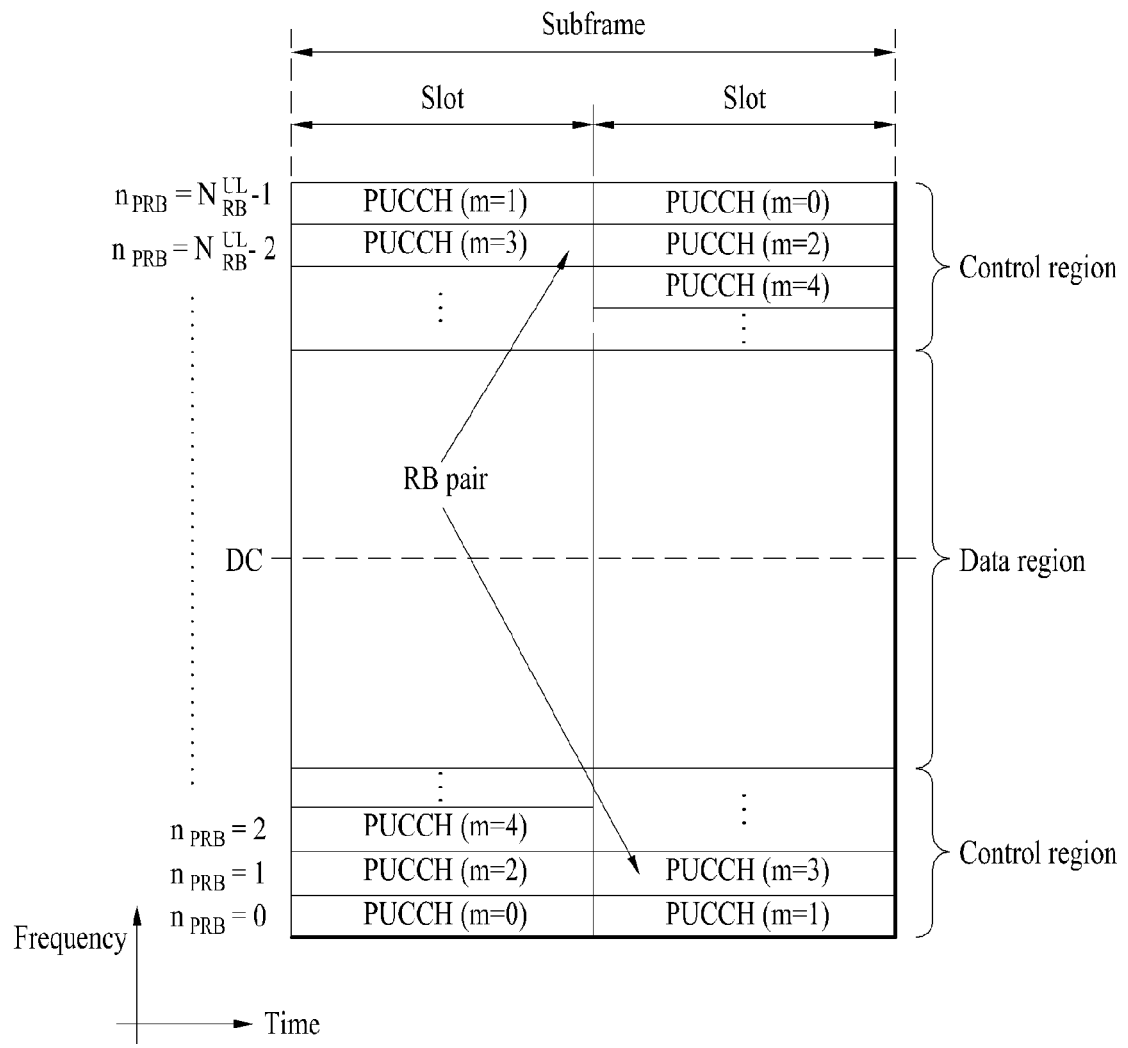

[Fig. 5]
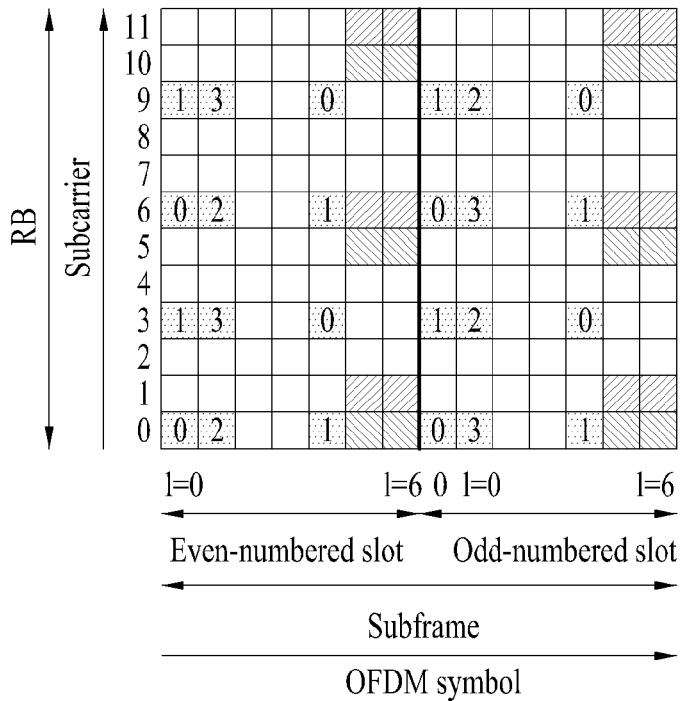
| p | RE occupied by CRS of port p ( $p \in 0$, $p \in 0,1$ or $p \in 0,1,2,3$ ) |
| --- | --- |
| ▨ | RE occupied by UE-RS of port(s) p ( $p \in 7$, $p \in 8$, $p \in 7,8$ or $p \in 7,8,11,13$ ) |
| ▧ | RE occupied by UE-RS of port(s) p ( $p \in 9$, $p \in 10$, $p \in 9,10$ or $p \in 9,10,12,14$ ) |
[Fig. 6]
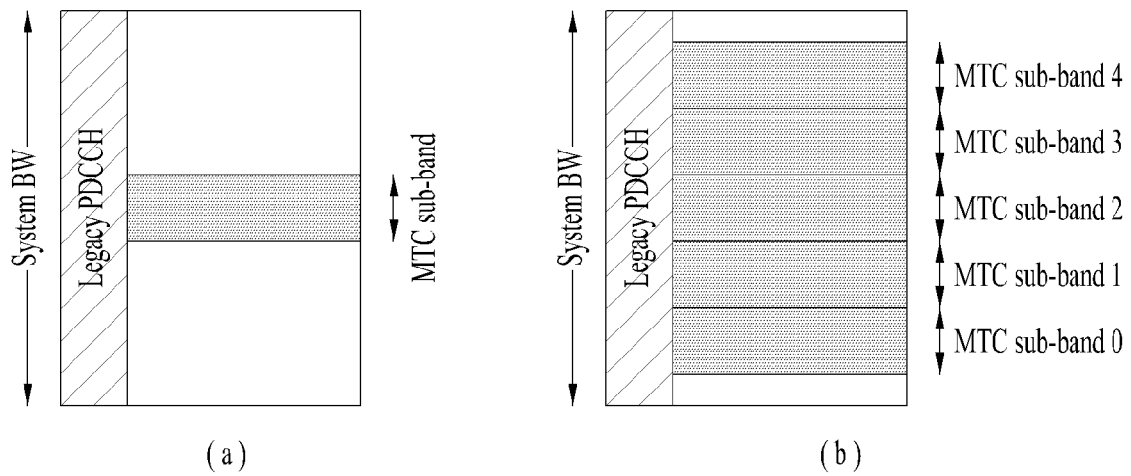

[Fig. 7]
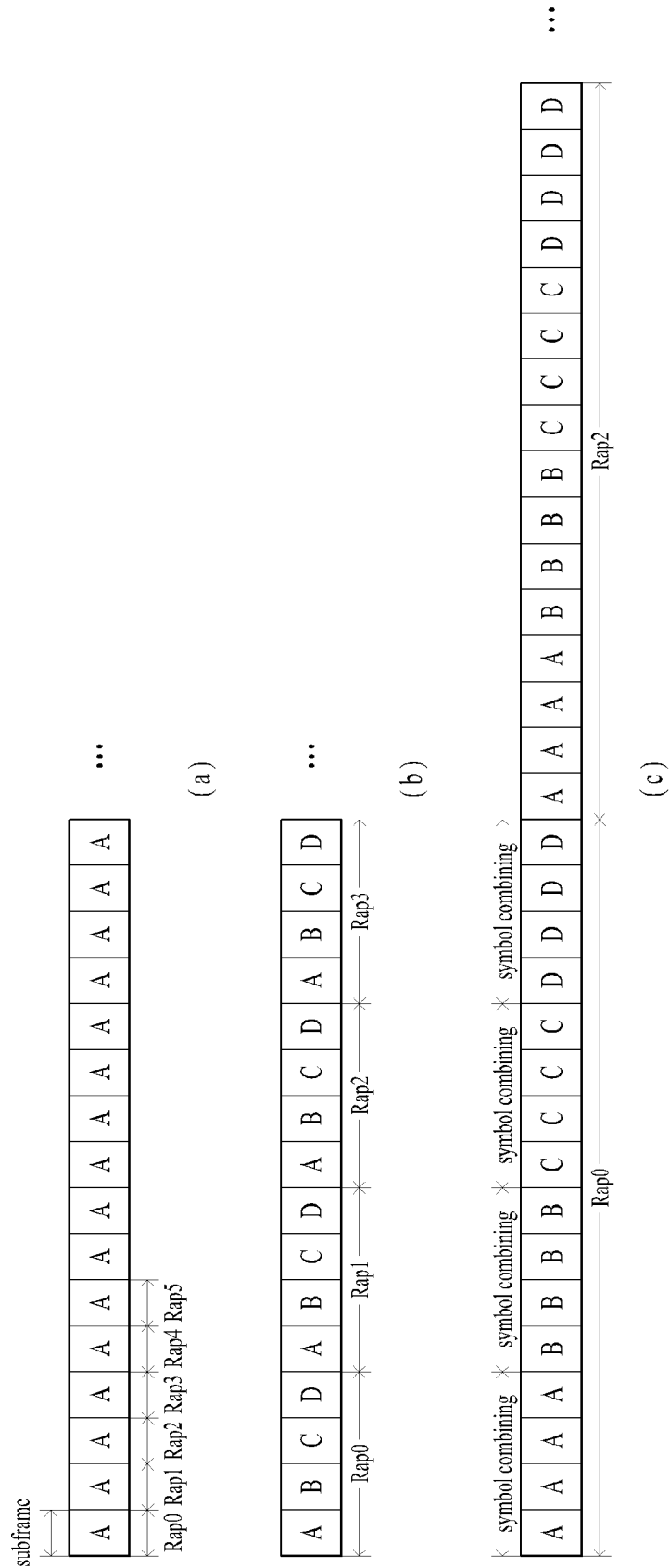

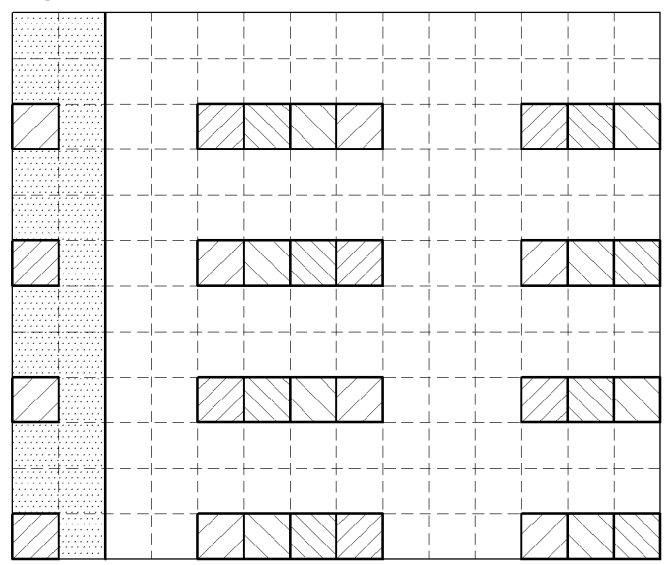
[Fig. 8]

[Fig. 9]

| | (a) | | | (b) | |
|---|---|---|---|---|---|
| REG 33 | | REG 32 | REG 135 | | REG 134 |
| REG 31 | | REG 30 | REG 133 | | REG 132 |
| REG 29 | | REG 28 | | | |
| REG 27 | REG 26 | REG 25 | | | |
| REG 24 | REG 23 | REG 22 | | | |
| REG 21 | REG 20 | REG 19 | | | |
| REG 18 | | REG 17 | | | |
| REG 16 | | REG 15 | | | |
| REG 14 | | REG 13 | | | |
| REG 12 | | REG 11 | | | |
| REG 10 | REG 9 | REG 8 | | | |
| REG 7 | REG 6 | REG 5 | | | |
| REG 4 | REG 3 | REG 2 | | | |
| REG 1 | | REG 0 | | | |
| REG 33 | | REG 32 | | | |
| REG 31 | | REG 30 | | | |
| REG 29 | | REG 28 | | | |
| REG 27 | REG 26 | REG 25 | | | |
| REG 24 | REG 23 | REG 22 | | | |
| REG 21 | REG 20 | REG 19 | | | |
| REG 18 | | REG 17 | | ⋮ | |
| REG 16 | | REG 15 | | | |
| REG 14 | | REG 13 | | | |
| REG 12 | | REG 11 | | | |
| REG 10 | REG 9 | REG 8 | | | |
| REG 7 | REG 6 | REG 5 | | | |
| REG 4 | REG 3 | REG 2 | | | |
| REG 1 | | REG 0 | | | |
| REG 33 | | REG 32 | | | |
| REG 31 | | REG 30 | | | |
| REG 29 | | REG 28 | | | |
| REG 27 | REG 26 | REG 25 | | | |
| REG 24 | REG 23 | REG 22 | | | |
| REG 21 | REG 20 | REG 19 | | | |
| REG 18 | | REG 17 | | | |
| REG 16 | | REG 15 | | | |
| REG 14 | | REG 13 | | | |
| REG 12 | | REG 11 | | | |
| REG 10 | REG 9 | REG 8 | | | |
| REG 7 | REG 6 | REG 5 | | | |
| REG 4 | REG 3 | REG 2 | REG 38 | REG 37 | REG 36 |
| REG 1 | | REG 0 | REG 35 | | REG 34 |
| REG 33 | | REG 32 | REG 33 | | REG 32 |
| REG 31 | | REG 30 | REG 31 | | REG 30 |
| REG 29 | | REG 28 | REG 29 | | REG 28 |
| REG 27 | REG 26 | REG 25 | REG 27 | REG 26 | REG 25 |
| REG 24 | REG 23 | REG 22 | REG 24 | REG 23 | REG 22 |
| REG 21 | REG 20 | REG 19 | REG 21 | REG 20 | REG 19 |
| REG 18 | | REG 17 | REG 18 | | REG 17 |
| REG 16 | | REG 15 | REG 16 | | REG 15 |
| REG 14 | | REG 13 | REG 14 | | REG 13 |
| REG 12 | | REG 11 | REG 12 | | REG 11 |
| REG 10 | REG 9 | REG 8 | REG 10 | REG 9 | REG 8 |
| REG 7 | REG 6 | REG 5 | REG 7 | REG 6 | REG 5 |
| REG 4 | REG 3 | REG 2 | REG 4 | REG 3 | REG 2 |
| REG 1 | | REG 0 | REG 1 | | REG 0 | subframe

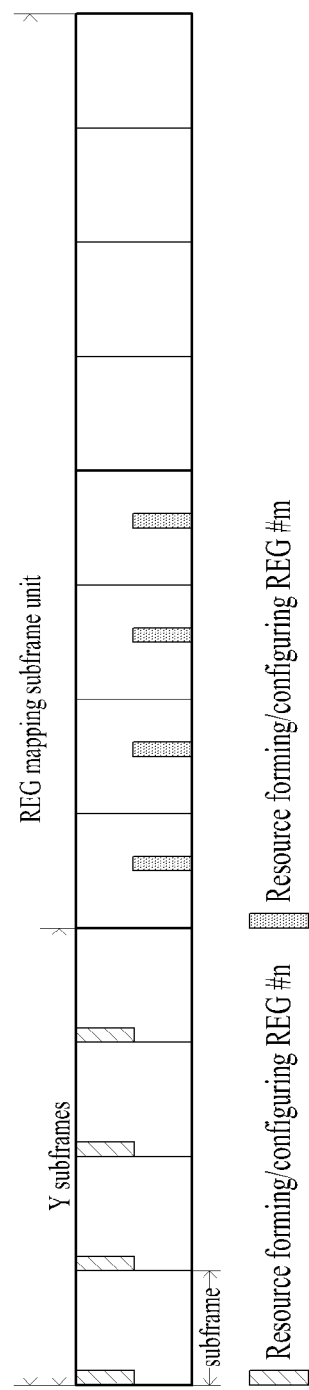
[Fig. 10]

[Fig. 11]
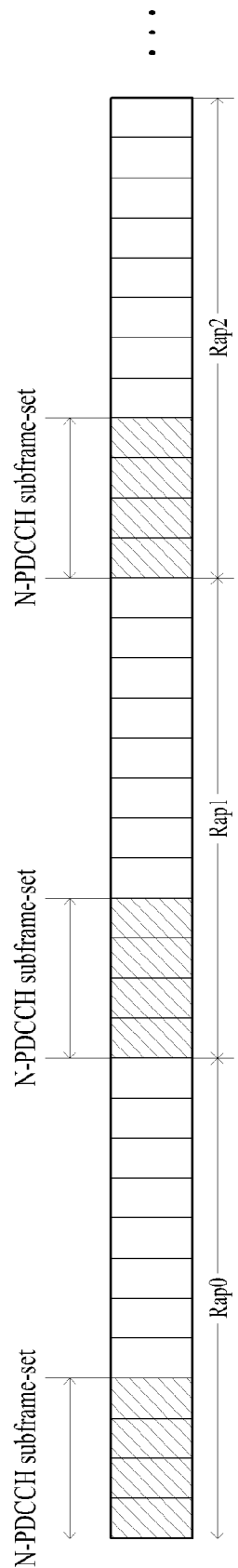

[Fig. 12]
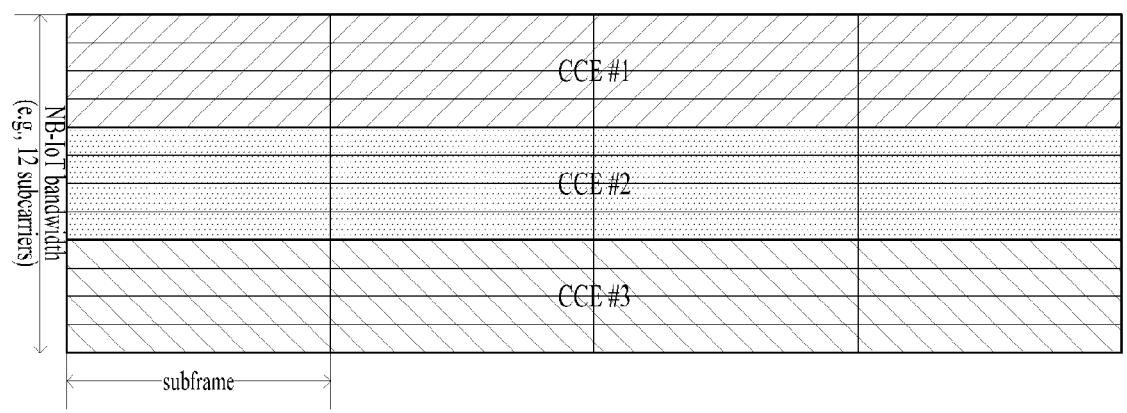
[Fig. 13]
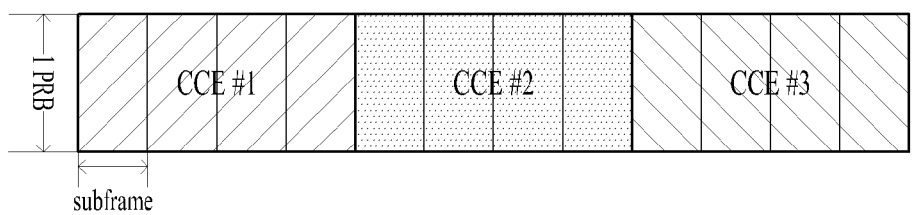

[Fig. 14]
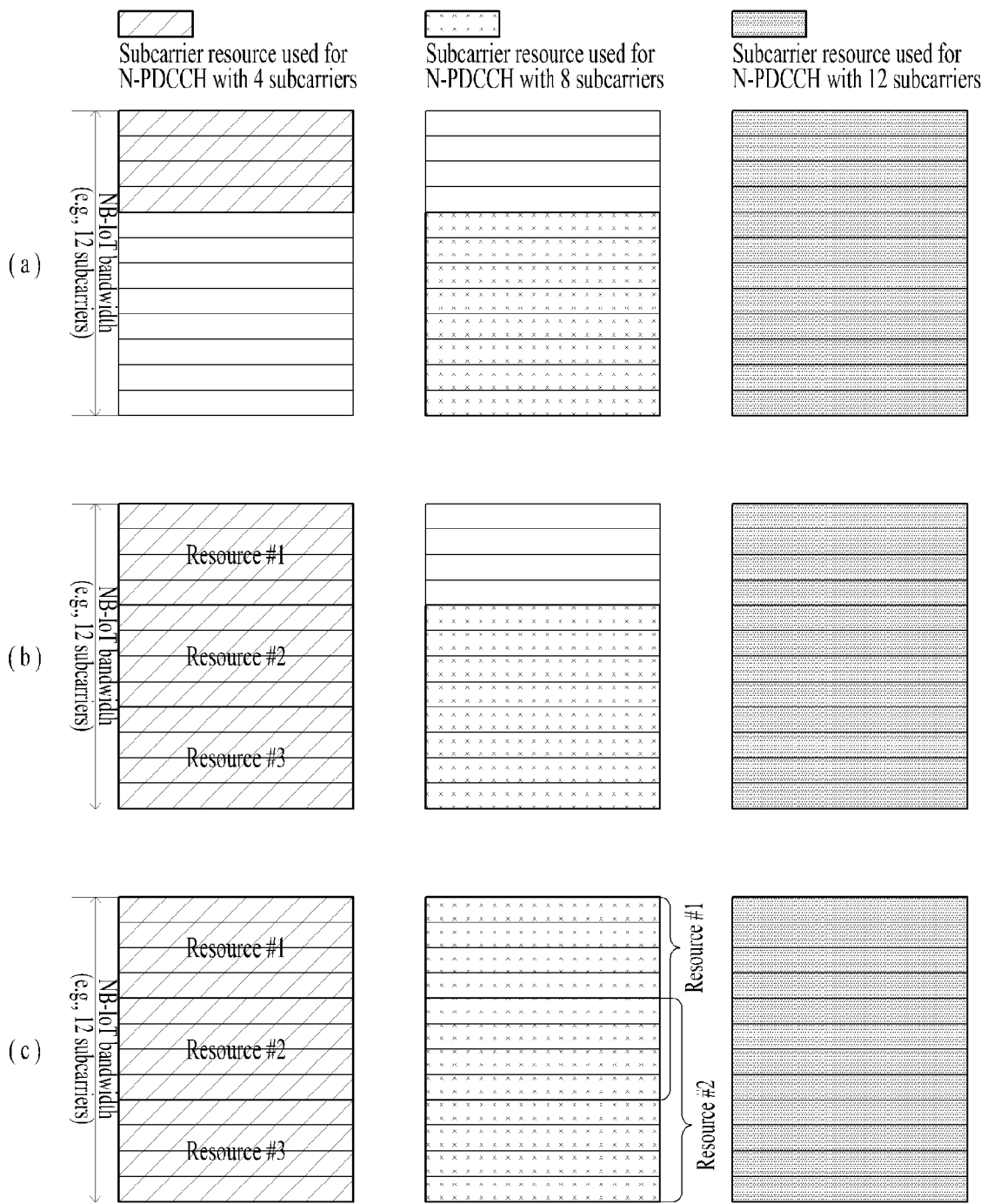

[Fig. 15]
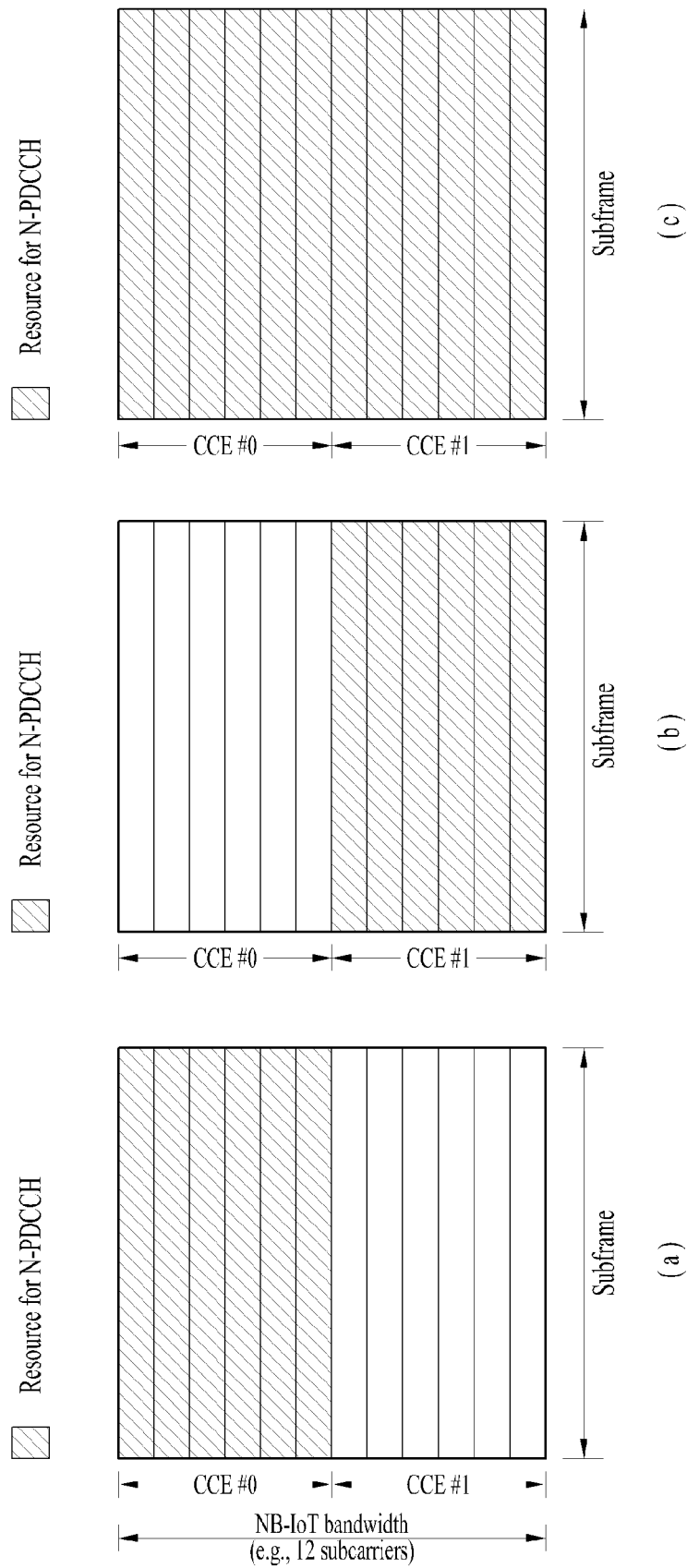

[Fig. 16]
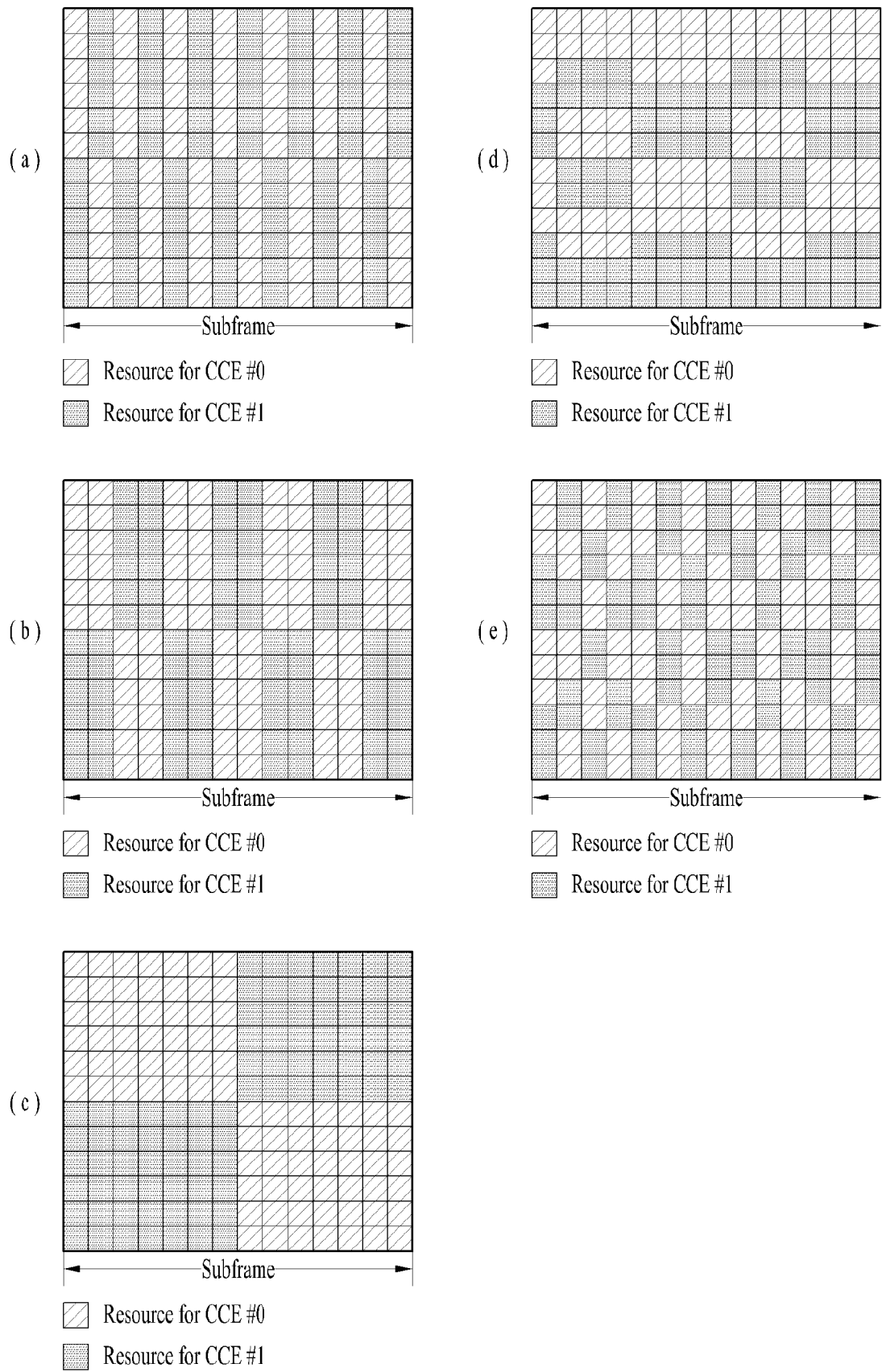

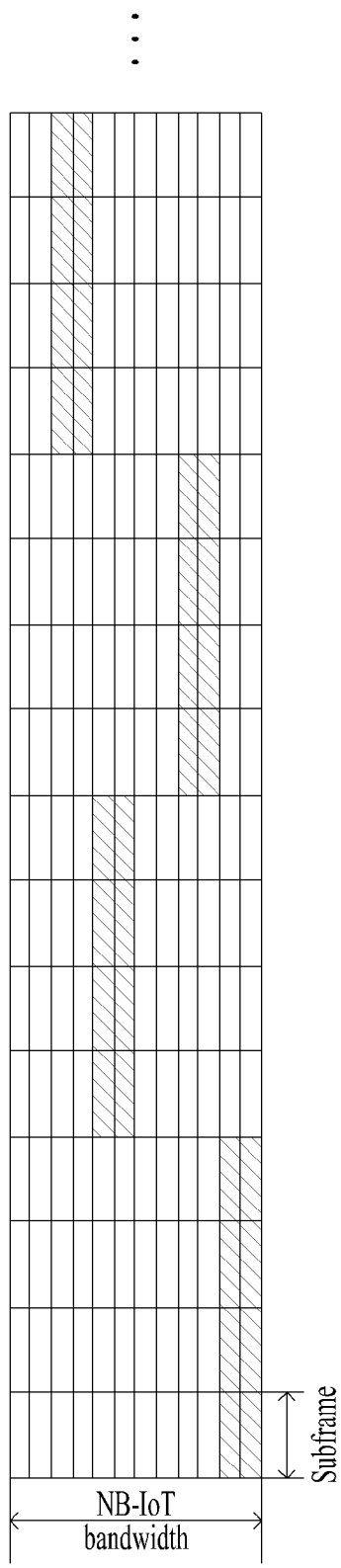
[Fig. 17]

[Fig. 18]
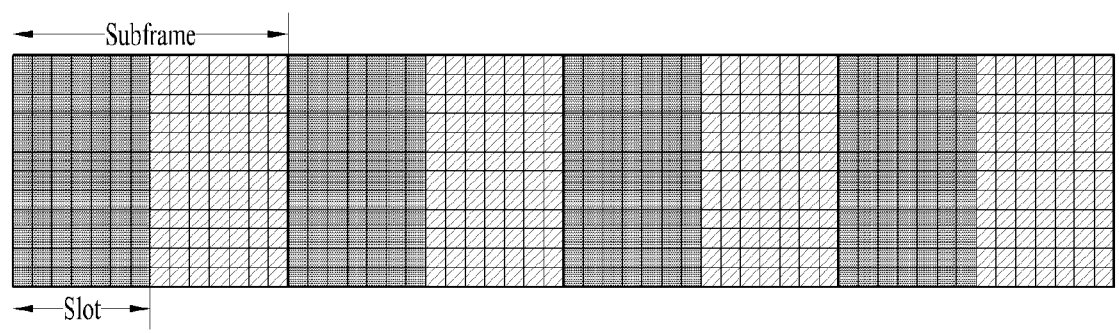
[Fig. 19]
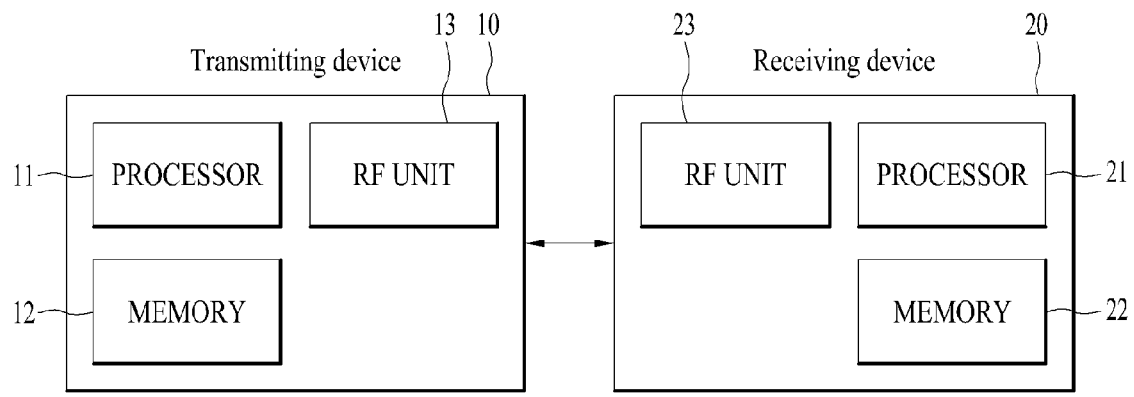

METHOD AND USER EQUIPMENT FOR RECEIVING DOWNLINK CONTROL INFORMATION, AND METHOD AND BASE STATION FOR TRANSMITTING DOWNLINK CONTROL INFORMATION

This application is the National Phase of PCT International Application No. PCT/KR2016/010538, filed on Sep. 21, 2016, which claims priority under 35 U.S.C. 119(e) to U.S. Provisional Application No. 62/234,615, filed on Sep. 29, 2015, No. 62/245,290, filed on Oct. 23, 2015, No. 62/265,402, filed on Dec. 9, 2015, No. 62/387,561, filed on Dec. 24, 2015, No. 62/276,996, filed on Jan. 11, 2016, No. 62/281,141, filed on Jan. 20, 2016, all of which are hereby expressly incorporated by reference into the present application.

TECHNICAL FIELD

The present invention relates to a wireless communication system, and more particularly, to a method for transmitting or receiving downlink control information and a device therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE OF INVENTION

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Solution to Problem

A method for downlink control information (DCI) transmission/reception is provided. The method for DCI transmission comprises: receiving, by a user equipment, a narrowband physical downlink control channel (N-PDCCH) carrying the DCI. The N-PDCCH is received using at least one of two control channel element (CCEs) on the 1 resource block (RB) only. A first CCE of the two CCEs occupies 6 subcarriers of the lowest indices among the 12 subcarriers and a second CCE of the two CCEs occupies 6 subcarriers of the highest indices among the 12 subcarriers.

In an aspect of the present invention, provided herein is a method for receiving, by a user equipment (UE), downlink control information (DCI) in narrowband internet of things (NB-IoT). The method comprises: receiving, by the UE, a narrowband physical downlink control channel (N-PDCCH) carrying the DCI; and receiving, by the UE, a physical downlink data channel (PDSCH) according to the DCI. The NB-IoT may use a channel bandwidth limited to 1 resource block (RB) which includes 12 subcarriers in a frequency domain. The N-PDCCH may be received using at least one of two control channel element (CCEs) on the 1 RB. A first CCE of the two CCEs may occupy 6 subcarriers of the lowest indices among the 12 subcarriers and a second CCE of the two CCEs may occupy 6 subcarriers of the highest indices among the 12 subcarriers.

In another aspect of the present invention, provided herein is a method for transmitting, by a base station (BS), downlink control information (DCI) in narrowband internet of things (NB-IoT). The method comprises: transmitting, to a user equipment (UE), a narrowband physical downlink control channel (N-PDCCH) carrying the DCI; and transmitting, to the UE, a physical downlink data channel (PDSCH) according to the DCI. The NB-IoT may use a channel bandwidth limited to 1 resource block (RB) which includes 12 subcarriers in a frequency domain. The N-PDCCH may be transmitted using at least one of two control channel element (CCEs) on the 1 RB. A first CCE of the two CCEs may occupy 6 subcarriers of the lowest indices among the 12 subcarriers and a second CCE of the two CCEs may occupy 6 subcarriers of the highest indices among the 12 subcarriers.

In another aspect of the present invention, provided herein is a user equipment (UE) for receiving downlink control information (DCI) in narrowband internet of things (NB-IoT). The UE comprises: a radio frequency (RF) unit, and a processor connected to the RF unit. The processor can be configured to: control the RF unit to receive a narrowband physical downlink control channel (N-PDCCH) carrying the DCI; and control the RF unit to receive a physical downlink data channel (PDSCH) according to the DCI. The NB-IoT may use a channel bandwidth limited to 1 resource block (RB) which includes 12 subcarriers in a frequency domain. The processor can be configured to control the RF unit to receive the N-PDCCH using at least one of two control channel element (CCEs) on the 1 RB. The processor can be configured to assume that a first CCE of the two CCEs occupies 6 subcarriers of the lowest indices among the 12 subcarriers and a second CCE of the two CCEs occupies 6 subcarriers of the highest indices among the 12 subcarriers.

In a further aspect of the present invention, provided herein is a base station (BS) for transmitting downlink control information (DCI) in narrowband internet of things (NB-IoT). The BS comprises: a radio frequency (RF) unit, and a processor connected to the RF unit. The processor can be configured to: control the RF unit to transmit, to a user equipment (UE), a narrowband physical downlink control channel (N-PDCCH) carrying the DCI; control the RF unit to transmit, to the UE, a physical downlink data channel (PDSCH) according to the DCI. The NB-IoT may use a channel bandwidth limited to 1 resource block (RB) which includes 12 subcarriers in a frequency domain. The processor can be configured to control the RF unit to transmit the N-PDCCH using at least one of two control channel element (CCEs) on the 1 RB. A first CCE of the two CCEs can occupy 6 subcarriers of the lowest indices among the 12 subcarriers and a second CCE of the two CCEs can occupy 6 subcarriers of the highest indices among the 12 subcarriers.

In each aspect of the present invention, the N-PDCCH can be transmitted with repetition. In this case, the BS can transmit the N-PDCCH only a N-PDCCH candidate configured with the two CCEs. The UE can monitor only a N-PDCCH candidate configured with the two CCEs to receive the N-PDCCH in case that the UE is configured with N-PDCCH repetition.

In each aspect of the present invention, the N-PDCCH can be transmitted with no repetition. In this case, the BS can transmit the N-PDCCH using a N-PDCCH candidate configured with the first CCE or a N-PDCCH configured with the second CCE. The UE can monitor a N-PDCCH candidate configured with the first CCE and a N-PDCCH configured with the second CCE in order to receive the N-PDCCH in case that the UE is configured with no N-PDCCH repetition.

In each aspect of the present invention, each of the first and second CCEs may have no resource element group (REG) mapped to a corresponding CCE.

In each aspect of the present invention, the N-PDCCH can be rate-matched within a reference signal resource on the RB.

The above technical solutions are merely some parts of the embodiments of the present invention and various embodiments into which the technical features of the present invention are incorporated can be derived and understood by persons skilled in the art from the following detailed description of the present invention.

Advantageous Effects of Invention

According to the present invention, uplink/downlink signals can be efficiently transmitted/received. Therefore, overall throughput of a radio communication system can be improved.

According to one embodiment of the present invention, a low cost/complexity UE can perform communication with a BS while maintaining compatibility with a legacy system.

According to one embodiment of the present invention, the UE can be implemented at low cost/complexity.

According to one embodiment of the present invention, coverage can be enhanced.

According to one embodiment of the present invention, the UE and the BS can perform communication with each other at a narrowband.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

FIG. 1 illustrates the structure of a radio frame used in a wireless communication system.

FIG. 2 illustrates the structure of a downlink (DL)/uplink (UL) slot in a wireless communication system.

FIG. 3 illustrates the structure of a DL subframe used in a wireless communication system.

FIG. 4 illustrates the structure of a UL subframe used in a wireless communication system.

FIG. 5 illustrates configuration of cell specific reference signals (CRSs) and user specific reference signals (UE-RS).

FIG. 6 illustrates an example of a signal band for MTC.

FIG. 7 illustrates examples of mapping of N-PDCCH to subframe(s) in accordance with the present invention.

FIGS. 8 to 10 illustrate REG resource mapping methods according to the present invention.

FIGS. 11 to 13 illustrate CCE configuration methods according to the present invention.

FIGS. 14 to 17 illustrate transmission resources of N-PDCCH according to the present invention in view of subcarriers.

FIG. 18 illustrates time axis transmission resources of N-PDCCH according to the present invention.

FIG. 19 is a block diagram illustrating elements of a transmitting device 10 and a receiving device 20 for implementing the present invention.

MODE FOR THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

FIG. 2 illustrates the structure of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             | —            | —            |

0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

FIG. 3 illustrates the structure of a DL subframe used in a wireless communication system.

Referring to FIG. 3, A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of a cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-spectfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread to a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

TABLE 4

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |

TABLE 4-continued

| DCI format | Description |
|---|---|
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

Other DCI formats in addition to the DCI formats defined in Table 4 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load, according to blind decoding attempt, at a certain level or less, not all DCI formats are searched by the UE at the same time. Table 5 illustrates transmission modes for configuring multi-antenna technology and DCI formats for allowing a UE to perform blind decoding at the corresponding transmission mode. Particularly, Table 5 illustrates a relation between PDCCH and PDSCH configured by C-RNTI (Cell RNTI (Radio Network Temporary Identifier)).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2D | UE specific by C-RNTI | Up to 8 layer transmission, ports 7-14 or single antenna port, port 7 or 8 |

Although transmission modes 1 to 10 are listed in Table 5, other transmission modes in addition to the transmission modes defined in Table 5 may be defined.

Referring to Table 5, a UE configured to a transmission mode 9, for example, attempts to decode PDCCH candidates of a UE-specific search space (USS) to a DCI format 1A, and attempts to decode PDCCH candidates of a common search space (CSS) and the USS to a DCI format 2C. The UE may decode a PDSCH in accordance with DCI based on the DCI format successfully decoded. If DCI decoding from one of a plurality of PDCCH candidates to the DCI format 1A is successfully performed, the UE may decode the PDSCH by assuming that up to 8 layers from antenna ports 7 to 14 are transmitted thereto through the PDSCH, or may decode the PDSCH by assuming that a single layer from the antenna port 7 or 8 is transmitted thereto through the PDSCH.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PCFICH and PHICH).

Assuming that the number of REGs not allocated to the PCFICH or the PHICH is N REG, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The following table shows an example of aggregation levels for defining SS.

TABLE 6

| Type | Search space $S^{(L)}_k$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |

TABLE 6-continued

| Type | Search space $S^{(L)}_k$ | | Number of PDCCH candidates $M^{(L)}$ |
|---|---|---|---|
| | Aggregation level L | Size [in CCEs] | |
| | 4 | 8 | 2 |
| | 8 | 16 | 2 |
| Common | 4 | 16 | 4 |
| | 8 | 16 | 2 |

For each serving cell on which PDCCH is monitored, the CCEs corresponding to PDCCH candidates m of the search space $S^{(L)}_k$ are configured by "$L*\{Y_k+m'\}$ mod floor $(N_{CCE,k}/L)\}+i$", where $i=0, \ldots, L-1$. For the common search space $m'=m$. For the PDCCH UE specific search space, for the serving cell on which PDCCH is monitored, if the monitoring UE is configured with carrier indicator field then $m'=m+M^{(L)}*n_{CI}$ where $n_{CI}$ is the carrier indicator field (CIF) value, else if the monitoring UE is not configured with carrier indicator field then $m'=m$, where $m=0, 1, \ldots, M^{(L)}-1$. $M^{(L)}$ is the number of PDCCH candidates to monitor at aggregation level L in the given search space. The carrier indication field value can be the same as a serving cell index (Serv-CellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k=(A \cdot Y_{k-1})$ mod D", where $Y_{-1}=n_{RNTI} \neq 0$, A=39827, D=65537 and $k=\text{floor}(n_s/2)$. $n_s$ is the slot number within a radio frame.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or noncontiguous in the frequency domain. For convenience, although it has been described that the bandwidth of UL CC and the bandwidth of DL CC are the same as each other and symmetric to each other, the bandwidth of each CC may be independently determined. Asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time−1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

In legacy systems subject to communication with one node, the UE-RS, CSI-RS, and CRS are transmitted at the same location, and therefore the UE does not consider a situation in which delay spread, Doppler spread, frequency shift, average received power, and received timing differ among the UE-RS port(s), CSI-RS port(s) and CRS port(s0. However, for a communication system to which coordinated Multi-Point (CoMP) communication technology allowing more than one node to simultaneously participate in communication with the UE is applied, the properties may differ among the PDCCH port(s), PDSCH port(s), UE-RS port(s), CSI-RS port(s) and/or CRS port(s). For this reason, the concept of a "quasi co-located antenna port" is introduced for a mode (hereinafter, CoMP mode) in which multiple nodes can participate in communication.

With respect to antenna ports, the term "Quasi co-located (QCL)" or "quasi co-location (QCL)" can be defined as follows: if two antenna ports are QCL, the UE may assume that the large-scale properties of a signal received through one of the two antenna ports can be inferred from the signal received through the other antenna port. The large-scale properties include delay spread, Doppler spread, frequency shift, average received power and/or received timing.

With respect to channels, the term QCL may also be defined as follows: if two antenna ports are QCL, the UE may assume that the large-scale properties of a channel for conveying a symbol on one of the two antenna ports can be inferred from the large-scale properties of a channel for conveying a symbol on the other antenna port. The large-scale properties include delay spread, Doppler spread, Doppler shift, average gain and/or average delay.

One of the two definitions of QCL given above may be applied to the embodiments of the present invention. Alternatively, the definition of QCL may be modified to assume that antenna ports for which QCL assumption is established are co-located. For example, QCL may be defined in a manner that the UE assumes that the antenna ports for which QCL assumption is established are antenna ports of the same transmission point.

For non-quasi co-located (NQC) antenna ports, the UE cannot assume the same large-scale properties between the antenna ports. In this case, a typical UE needs to perform independent processing for each NQC antenna with respect to timing acquisition and tracking, frequency offset estimation and compensation, and delay estimation and Doppler estimation.

On the other hand, for antenna ports for which QCL assumption can be established, the UE performs the following operations:

Regarding Doppler spread, the UE may apply the results of estimation of the power-delay-profile, the delay spread and Doppler spectrum and the Doppler spread for one port to a filter (e.g., a Wiener filter) which is used for channel estimation for another port;

Regarding frequency shift and received timing, after performing time and frequency synchronization for one port, the UE may apply the same synchronization to demodulation on another port;

Further, regarding average received power, the UE may average measurements of reference signal received power (RSRP) over two or more antenna ports.

For example, if the UE receives a specific DMRS-based DL-related DCI format (e.g., DCI format 2C) over a PDCCH/EPDCCH, the UE performs data demodulation after performing channel estimation of the PDSCH through a configured DMRS sequence. If the UE can make an assumption that a DMRS port configuration received through the DL scheduling grant and a port for a specific RS (e.g., a specific CSI-RS, a specific CRS, a DL serving cell CRS of the UE, etc.) port are QCL, then the UE may apply the estimate(s) of the large-scale properties estimated through the specific RS port to channel estimation through the DMRS port, thereby improving processing performance of the DMRS-based receiver.

FIG. 5 illustrates configuration of cell specific reference signals (CRSs) and user specific reference signals (UE-RS). In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, the CRS is transmitted through antenna ports p=0, p=0, 1, p=0, 1, 2, 3 in accordance with the number of antenna ports of a transmission mode. The CRS is fixed to a certain pattern within a subframe regardless of a control region and a data region. The control channel is allocated to a resource of the control region, to which the CRS is not allocated, and the data channel is also allocated to a resource of the data region, to which the CRS is not allocated.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , v+6 for PDSCH transmission, where u is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , v+6, a part of UE-RS sequence r(m) is mapped to complex-valued modulation symbols $a^{(p)}_{k,l}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad [\text{Math.1}]$$

where $w_p(i)$, l', m' are given as follows.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad [\text{Math. 2}]$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where $n_s$ is the slot number within a radio frame and an integer among 0 to 19. The sequence $$\overline{w}_p(i)$$

for normal CP is given according to the following equation.

TABLE 7

| Antenna port p | $[\overline{w}_p(0)\ \overline{w}_p(1)\ \overline{w}_p(2)\ \overline{w}_p(3)]$ |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p {7, 8, . . . , v+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad [\text{Math. 3}]$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0, 1, . . . , $M_{PN}$−1, is defined by the following equation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad [\text{Math.4}]$$

where $N_C=1600$ and the first m-sequence is initialized with $x_1(0)=1$, $x_1(n)=0$, $n=1, 2, \ldots, 30$. The initialization of the second m-sequence is denoted by $$c_{init}=\Sigma_{i=0}^{30} x_2(i) \cdot 2^i$$

with the value depending on the application of the sequence.

In Equation 3, the pseudo-random sequence generator for generating c(i) is initialized with $c_{init}$ at the start of each subframe according to the following equation.

$$c_{init}=(\lfloor n_s/2 \rfloor+1) \cdot (2n_{ID}^{(nSCID)}+1) \cdot 2^{16}+n_{SCID}$$ [Math.5]

In Equation 5, the quantities $n^{(i)}_{ID}$, i=0, 1, which is corresponding to $n^{(nSCID)}_{ID}$, are given by a physical layer cell identity $N^{cell}_{ID}$ if no value for a scrambling identity $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2C. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107, 108, 109, 110} as the associated EPDCCH physical resource, is present for EPDCCH demodulation only if the EPDCCH transmission is associated with the corresponding antenna port, and is transmitted only on the PRB(s) upon which the corresponding EPDCCH is mapped.

For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signalling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

An EPDCCH UE-specific search space $ES^{(L)}_k$ at aggregation level $L \in \{1, 2, 4, 8, 16, 32\}$ is defined by a set of EPDCCH candidates.

For an EPDCCH-PRB-set p, the ECCEs corresponding to EPDCCH candidate m of the search space $ES^{(L)}_k$ are given by the following equation.

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor\right\} + i$$ [Math. 6]

where i=0, . . . , L−1. $b=n_{CI}$ if the UE is configured with a carrier indicator field for the serving cell on which EPDCCH is monitored, otherwise b=0. no is the carrier indicator field (CIF) value, which is the same as a serving cell index (ServCellIndex). m=0, 1, . . . , $M^{(L)}_p-1$, $M^{(L)}_p$ is the number of EPDCCH candidates to monitor at aggregation level L in EPDDCH-PRB-set p. The variable $Y_{p,k}$ is defined by '$Y_{p,k}=(A_p \cdot Y_{p,k-1})$ mod D', where $Y_{p,-1}=n_{RNTI} \neq 0$, $A_0=39827$, $A_0=39829$, D=65537 and k=floor($n_s/2$). $n_s$ is the slot number within a radio frame.

A UE is not expected to monitor an EPDCCH candidate, if an ECCE corresponding to that EPDCCH candidate is mapped to a PRB pair that overlaps in frequency with a transmission of either PBCH or PSS/SSS in the same subframe.

An EPDCCH is transmitted using an aggregation of one or several consecutive enhanced control channel elements (ECCEs). Each ECCE consists of multiple enhanced resource element groups (EREGs). EEREGs are used for defining the mapping of enhanced control channels to resource elements. There are 16 EREGs, numbered from 0 to 15, per physical resource block (PRB) pair. Number all resource elements (REs), except resource elements carrying DMRS (hereinafter EPDCCH DMRS) for demodulation of the EPDCCH, in a physical resource-block pair cyclically from 0 to 15 in an increasing order of first frequency, then time. Therefore all the REs, except REs carrying the EPD- CCH DMRS, in the PRB pair has any one of numbers 0 to 15. All REs with number i in that PRB pair constitutes EREG number i. As described above, it is noted that EREGs are distributed on frequency and time axes within the PRB pair and an EPDCCH transmitted using aggregation of one or more ECCEs, each of which includes a plurality of EREGs, is also distributed on frequency and time axes within the PRB pair.

The number of ECCEs used for one EPDCCH depends on the EPDCCH format as given by Table 8, the number of EREGs per ECCE is given by Table 9. Table 8 shows an example of supported EPDCCH formats, and Table 9 shows an example of the number of EREGs per ECCE, $N^{EREG}_{ECCE}$. Both localized and distributed transmission is supported.

TABLE 8

| | Number of ECCEs for one EPDCCH, $N^{ECCE}_{EPDCCH}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 9

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

An EPDCCH can use either localized or distributed transmission, differing in the mapping of ECCEs to EREGs and PRB pairs. One or two sets of PRB pairs which a UE shall monitor for EPDCCH transmissions can be configured. All EPDCCH candidates in EPDCCH set $S_p$ (i.e., EPDCCH-PRB-set) use either only localized or only distributed transmission as configured by higher layers. Within EPDCCH set $S_p$ in subframe k, the ECCEs available for transmission of EPDCCHs are numbered from 0 to $N_{ECCE,p,k}-1$. ECCE number n is corresponding to the following EREG(s):

EREGs numbered (n mod $N^{ECCE}_{RB}$)+$jN^{ECCE}_{RB}$ in PRB index floor(n/$N^{ECCE}_{RB}$) for localized mapping, and EREGs numbered floor (n/$N^{Sm}_{RB}$)+$jN^{ECCE}_{RB}$ in PRB indices (n+j·max(1, $N^{Sp}_{RB}/N^{EREG}_{ECCE}$))mod $N^{Sp}_{RB}$ for distributed mapping, where j=0, 1, . . . , $N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 8 applies when:
DCI formats 2, 2A, 2B, 2C or 2D is used and $N^{DL}_{RB} \geq 25$, or
any DCI format when $n_{EPDCCH} < 104$ and normal cyclic prefix is used in normal subframes or special subframes with configuration 3, 4, 8.

Otherwise case B is used. The quantity $n_{EPDCCH}$ for a particular UE is defined as the number of downlink resource elements (k,l) in a PRB pair configured for possible EPDCCH transmission of EPDCCH set $S_0$ and fulfilling all of the following criteria, they are part of any one of the 16 EREGs in the physical resource-block pair, they are assumed by the UE not to be used for CRSs or CSI-RSs, the index l in a subframe fulfils $l \geq l_{EPDCCHStart}$.

where $l_{EPDCCHStart}$ is given based on higher layer signaling 'epdcch-StartSymbol-r11', higher layer signaling 'pdsch-Start-r11', or CFI value carried by PCFICH.

The mapping to resource elements (k,l) on antenna port p meeting the criteria above is in increasing order of first the index k and then the index l, starting with the first slot and ending with the second slot in a subframe.

For localized transmission, the single antenna port p to use is given by Table 10 with $n'=n_{ECCE,low}$ mod $N^{ECCE}_{RB}+n_{RNTI}$ mod min($N^{ECCE}_{EPDCCH}$, $N^{ECCE}_{RB}$), where $n_{ECCE,low}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for this EPDCCH.

TABLE 10

| | Normal cyclic prefix | | |
|---|---|---|---|
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner where p∈{107, 109} for normal cyclic prefix and p∈{107, 108} for extended cyclic prefix.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

FIG. 6 illustrates an example of signal bands for MTC.

As one method for reducing the cost of the MTC UE, an operation of the MTC UE may be performed at a reduced UE downlink and uplink bandwidth of 1.4 MHz, for example, regardless of an operating system bandwidth of a cell. At this time, a subband (narrowband) for operating the MTC UE may always be located at the center (e.g., 6 center PRBs) of a cell as shown in FIG. 6(a), or several subbands for MTC may be provided for one subframe to multiplex MTC UEs as shown in FIG. 6(b), whereby the UEs may use their respective subbands different from each other or the UEs use the same subband not the subband of 6 center PRBs.

In this case, the MTC UE cannot receive a legacy PDCCH transmitted through a full system band normally, and transmission of PDCCH for the MTC UE from an OFDM symbol region within which the legacy PDCCH is transmitted may not be preferable due to multiplexing issue with a PDCCH transmitted to another UE. As one method for solving this, it is required to introduce a control channel transmitted within a subband where MTC is operated for the MTC UE. As a downlink control channel for such a low-complexity MTC UE, the legacy EPDCCH may be used as it is. Or, M-PDCCH for the MTC UE which is a control channel of a modified type of the legacy PDCCH/EPDCCH may be introduced. Hereinafter, in the present invention, the legacy EPDCCH or M-PDCCH for the low-complexity MTC UE or normal complexity MTC UE will be referred to as M-PDCCH. Also, MTC-EPDCCH is hereinafter used to refer to M-PDCCH.

To further lower the cost of the MTC UE, an environment that the MTC UE is operated through a narrow bandwidth of 200 KHz may be considered. The MTC UE which may be operated within a narrow bandwidth may be operated to be backward compatible within a legacy cell having a bandwidth wider than 200 KHz. A clean frequency band having no legacy cell may be deployed for such an MTC UE only. In the present invention, a system operated through a narrowband of one PRB level within a legacy cell having a bandwidth wider than 200 KHz will be referred to as an in-band narrowband (NB) IoT (Internet of Things), and a system operated through a narrowband of one PRB level for the MTC UE only at a clean frequency band having no legacy cell will be referred to as a stand-alone NB-IoT.

To specify a radio access for cellular internet of things, based to a great extent on a non-backward-compatible variant of EUTRA, the following characteristics can be addressed:

improved indoor coverage,
support for massive number of low throughput devices,
low delay sensitivity, ultra low device cost, and
low device power consumption and (optimised) network architecture.

NB-IoT can support the following three different modes of operation:

'Stand-alone operation' utilizing for example the spectrum currently being used by GERAN systems as a replacement of one or more GSM carriers, 'Guard band operation' utilizing the unused resource blocks within a LTE carrier's guard-band, and 'In-band operation' utilizing resource blocks within a normal LTE carrier.

In particular, the following can be supported:

180 kHz UE RF bandwidth for both downlink and uplink, and

OFDMA on the downlink:

Two numerology options are considered for inclusion: 15 kHz subcarrier spacing (with normal or extended CP) and 3.75 kHz subcarrier spacing, For the uplink, two options can be considered: FDMA with GMSK (Gaussian minimum shift keying) modulation, and SC-FDMA (including single-tone transmission as a special case of SC-FDMA), The present invention suggests a PDCCH/EPDCCH (hereinafter, NB-PDCCH or N-PDCCH) transmission scheme for an IoT UE in an NB-LTE environment that MTC UE is operated within a narrow bandwidth of 180 KHz.

Hereinafter, for convenience of description, the embodiments of the present invention will be described on the assumption of an environment that an IoT UE is operated within a system deployed for the IoT UE. However, it will be apparent that the present invention may be applied to other UEs and systems.

Also, the suggestions of the present invention may be applied to transmission of other channels such as PDCCH, PDSCH, and PBCH as well as N-PDCCH.

In the following embodiments, the expression "assume" may mean that an entity for transmitting a channel transmits the channel to be suitable for the corresponding "assumption". An entity for receiving the channel may receive or decode the channel to be suitable for the corresponding "assumption" provided that the channel has been transmitted to be suitable for the corresponding "assumption".

<A. Subframe Resource for N-PDCCH Mapping>

FIG. 7 illustrates examples of mapping of N-PDCCH to subframe(s) in accordance with the present invention.

Resource mapping of the N-PDCCH may be performed within one subframe. That is, one DCI may be mapped into a resource region within one subframe. As shown in FIG. 7(a), one N-PDCCH is fully mapped within one subframe, and is transmitted through each of a plurality of subframes, whereby the N-PDCCH may be transmitted by being repeated multiple times. In this case, N-PDCCH of the same content is transmitted at each of the plurality of subframes.

On the other hand, one N-PDCCH may be mapped within a resource of a plurality of subframes (e.g., X number of subframes). That is, one DCI may be mapped over the resource region of the plurality of subframes. As shown in FIG. 7(b), for example, N-PDCCH mapping is performed over 4 subframes (that is, X=4), and a bundle of 4 subframes to which one N-PDCCH is mapped may be transmitted repeatedly. Referring to FIG. 7(b), one N-PDCCH signal may divisionally be mapped to subframes A, B, C and D, and a bundle of subframes A, B, C and D, each of which divisionally has the N-PDCCH, may be transmitted repeatedly. For example, one subframe does not include all of N-PDCCH signals, and resource mapping of the N-PDCCH may be performed in a unit of X subframes If the same content is transmitted on the same RE location within consecutive subframes, symbol-level (that is, RE-level) combining may be performed. In this case, effects such as UE buffer size reduction, complexity reduction and performance improvement can be obtained. To enable RE-level combining, resource mapping of one N-PDCCH may be performed within a resource of a plurality of (e.g., X) subframes, and each of the X subframes may be repeated for Y consecutive subframes. A bundle of X*Y subframes may be transmitted repeatedly. For example, referring to FIG. 7(c), supposing that subframes A, B, C and D are X=4 subframes to which N-PDCCH is divisionally mapped, each of the subframes A, B, C and D may be repeated as consecutive Y=4 subframes, whereby the N-PDCCH may be transmitted through a total of 16 subframes X*Y=16 in the form of A, A, A, A, A, B, B, B, B, C, C, C, C, D, D, D, D. In this case, the subframes marked with the same character among A, B, C and D have the same N-PDCCH part. These X*Y=16 subframes may be transmitted repeatedly.

<B. Physical Downlink Control Channel Design for NB-IoT>

For physical downlink control channel design for NB-IoT, with its maturity and the commonality with LTE-MTC, EPDCCH or M-PDCCH can be used for NB-IoT. Since EPDCCH is transmitted using all possible resources within a subframe, it is obvious that EPDCCH design is more appropriate than PDCCH design for NB-IoT physical downlink control channel. Then, RS pattern based on DMRS also can be used for this downlink control channel demodulation.

Unlike legacy EPDCCH, N-PDCCH should be mapped into 1 PRB in a subframe. Since resource mapping of legacy EPDCCH is based on 2, 4, and 8 PRBs and M-PDCCH would be based on 6 PRBs additionally, it needs to be discussed how to transmit N-PDCCH via 1 PRB. For example, full resources within a subframe can be utilized always to transmit a NB-IoT EPDCCH, M-PDCCH mapping using 6 PRBs in a subframe can be transformed to N-PDCCH mapping using 1 PRB and 6 subframes, or new resource mapping rule using modified ECCE to RE mapping can be adopted.

Since N-PDCCH can be transmitted within 180 kHz bandwidth, distributed transmission to achieve frequency diversity would be not necessary. Then, utilizing localized transmission scheme only using one antenna port could be enough for N-PDCCH transmission.

<C. Search Space Composition for NB-IoT>

For search space design for N-PDCCH, following aspects needs to be considered.

CSS and USS: Similar to LTE system, there can be two types of search space. One is to schedule broadcast data such as random access response (RAR) and paging, and the other one is to schedule unicast data.

N-PDCCH Monitoring Subframes: To reduce the power consumption, it could be necessary to restrict the resources for control channel monitoring. One possible mechanism is to allocate a subset of available time resources for N-PDCCH monitoring to a UE. Then the UE does not have to monitor every possible resource for its control message reception.

N-PDCCH Multiplexing: To support multiple NB-IoT UEs at the same time, whereas not to increase power consumption and blocking probability, multiplexing N-PDCCHs for UEs (in a same coverage class) can be considered. For example, multiplexing N-PDCCHs using different subframe resources and/or multiplexing N-PDCCHs within a subframe can be considered. When a plurality of N-PDCCHs should be transmitted by being multiplexed, if resources of the N-PDCCHs are overlapped with one another, one of the overlapped N-PDCCHs may be transmitted and transmission of the other N-PDCCH(s) may be blocked. A blocking probability means the probability that transmission of one N-PDCCH may block transmission of the other N-PDCCHs.

PRB-Set: For legacy EPDCCH, up to two PRB-sets are supported. However, since there would be only one PRB, the concept of PRB-set in EPDCCH may be not necessary.

Monitoring DCI Format: It would be desirable to support a single demodulation RS among all channels. In other words, a common RS may be used for transmission or reception of downlink channels regardless of types of the channels. This RS can be use DMRS pattern, and single transmission scheme can be applied to all downlink channels including NB-IoT PBCH, EPDCCH and PDSCH. Under this assumption, a UE would not be required to monitor more than one DCI formats for PDSCH scheduling since there would be a single transmission scheme for PDSCH.

<D. REG Resource Mapping>

If N-PDCCH is transmitted using a space frequency block coding (SFBC) transmission scheme, REG may be used as a resource mapping unit of the N-PDCCH. SFBC is operated on an adjacent subcarrier pair and defined for two transmitting antennas only. Extension up to 4 antennas may be performed by combining of SFBC and frequency-changed transmission diversity. The SFBC operation is performed on pairs of complex valued modulation symbols. Hence each pair of has an associated pair of frequency resources (i.e., a pair of subcarriers). In LTE, for SFBC transmission, the symbols are transmitted from two antenna ports on each pair of adjacent subcarriers as follows.

$$\begin{bmatrix} y^0(2j) & y^0(2j+1) \\ y^1(2j) & y^1(2j+1) \end{bmatrix} = \begin{bmatrix} x_{2j} & x_{2j+1} \\ -x_{2j+1}^* & x_{2j}^* \end{bmatrix} \quad [\text{Math. 7}]$$

where $y^{(p)}(k)$ denotes the symbols transmitted on the k-th subcarrier from antenna port p. $x_{2j}$ and $x_{2j+1}$ (j=0, 1, 2, ..., N/2−1) are two adjacent subcarriers in an OFDM symbol.

[0001] FIGS. 8 to 10 illustrate REG resource mapping methods according to the present invention.

An REG for resource mapping of N-PDCCH may be configured as follows.

REG Configuration Method 1

Like a legacy PDCCH, one REG may include 4 consecutive REs on a frequency axis. In this case, RE(s) for CRS and/or additional RS (hereinafter, NB-RS) transmission for NB-IoT UE may be excluded. In other words, REG(s) may be mapped to REs except the RE(s) for CRS and/or NB-RS. A mapping range of the REG may be the same as a narrow bandwidth (that is, 1 PRB, 12 subcarriers) where NB-IoT is operated on a frequency axis, and may be the same as one subframe (e.g., 1 ms) on a time axis. That is, REG(s) may be mapped within a narrow bandwidth (that is, 1 PRB, 12 subcarriers) where NB-IoT is operated on a frequency axis, and may be mapped within one subframe (e.g., 1 ms) on a time axis. An OFDM symbol region (e.g., a region of first two or three OFDM symbols within a subframe) used for transmission of a legacy PDCCH may be excluded from a resource region to which REG is mapped. That is, REG may not be mapped to REs within an OFDM symbol region within which a legacy PDCCH may be transmitted.

For example, if RE location at which a legacy CRS and NB-RS are transmitted is as shown in FIG. 8, each REG within a subframe may be configured as shown in FIG. 9(a). A total of 34 REGs may exist within one subframe, and each REG includes 4 consecutive REs on a frequency axis except CRS/NB-RS RE. In this case, the same REG mapping is used per subframe.

REG Configuration Method 2

One REG may include 4 consecutive REs on a frequency axis. In this case, REs (hereinafter, CRS/NB-RS RE) for CRS and/or NB-RS transmission may be excluded from REG mapping resources. A mapping range of the REG may be the same as a narrow bandwidth (that is, 1 PRB, 12 subcarriers) where NB-IoT is operated on a frequency axis, and may be the same as a plurality of subframes (e.g., X subframes, X ms) on a time axis. That is, REG(s) may be mapped within a narrow bandwidth (that is, 1 PRB, 12 subcarriers) where NB-IoT is operated on a frequency axis, and may be mapped within a plurality of subframes (e.g., X subframes, X ms) on a time axis. An OFDM symbol region (e.g., a region of first two or three OFDM symbols within a subframe) used for transmission of a legacy PDCCH may be excluded from a resource region to which REG is mapped.

For example, if RE location to which a legacy CRS and NB-RS are transmitted is as shown in FIG. 8, each REG within a subframe may be configured as shown in FIG. 9(b). If a unit of a subframe to which REG is mapped is X=4 subframes, a total of 34*4=136 REGs may exist in a unit of 4 subframes, and each REG includes 4 consecutive REs on a frequency axis except CRS/NB-RS RE. At this time, the same REG mapping is used per 4 subframes.

REG Configuration Method 3

One REG may be configured using a resource within a plurality of (consecutive) subframes (e.g., Y subframes). At this time, a total of 4*Y REs (4 REs per subframe) configure one REG. For symbol-level or RE-level combining, one REG may be configured using the same REs at each of Y subframes. That is, for example, REs #i, i+1, i+2, i+3 per subframe within a total of Y subframes may configure one REG. A mapping range of the REG may be the same as a narrow bandwidth (that is, 1 PRB, 12 subcarriers) where NB-IoT is operated on a frequency axis, and may be the same as a plurality of subframes (e.g., X subframes, Xms) on a time axis. At this time, X may be the same as a multiple of Y. An OFDM symbol region (e.g., a region of first two or three OFDM symbols within a subframe) used for transmission of a legacy PDCCH may be excluded from a resource region to which REG is mapped.

For example, as shown in FIG. 10, REG mapping may be defined within 'REG mapping subframe unit' comprised of X subframes. A resource configuring one REG within 'REG mapping subframe unit' comprised of X subframes may include the same 4 REs per subframe for Y=4 subframes, and RE resource configuring the REG may 4 consecutive REs (except CRS RE and/or NB-RS RE) located at the same OFDM symbol within each subframe of the Y subframes. In this case, REG may include a total of Y*4=16 REs.

N-PDCCH Transmission without REG Concept

The N-PDCCH may be transmitted in an SFBC scheme without using the concept of REG. That is, one SFBC pair for the N-PDCCH may be mapped to 2 consecutive REs configuring N-PDCCH transmission resource in the order of frequency first and time second within the resource region to which the N-PDCCH is transmitted. In a legacy CRS RE and/or NB-RS RE, transmission of the N-PDCCH may be rate-matched. That is, the N-PDCCH may be mapped to REs except legacy CRS/NB-RS RE(s).

<E. New ECCE to EREG Mapping for N-PDCCH>

In case of the legacy EPDCCH, EREG configuring ECCE is determined as stated in the description of Table 8 to Table 10. The present invention suggests a CCE to REG mapping method in an NB-IoT environment where 1 PRB only exists at one subframe, that is, a CCE configuration method.

FIGS. 11 to 13 illustrate CCE configuration methods according to the present invention.

CCE Configuration Method 1

The REG configuration method for the CCE configuration method 1 may assume 'REG configuration method 2' or 'REG configuration method 3' among the REG configuration methods described in the section D.

One CCE may be configured using a plurality of REGs (e.g., 9 REGs) among REGs defined within a plurality of subframes (e.g., X subframes). For example, if 136 REGs exist within the X subframes, 9 REGs of the 136 REGs may configure one CCE. One CCE may include non-consecutive REGs, which are determined by a specific interleaving equation, among a total of REG resources existing within the X subframes.

CCE Configuration Method 2

For subframe-level multiplexing between control channels or between a control channel and a data channel, as shown in FIG. 11, a subframe-set (hereinafter, N-PDCCH monitoring subframe-set or N-PDCCH subframe-set) for monitoring N-PDCCH by a UE within a subframe unit where N-PDCCH is repeated, that is, a subframe unit to which N-PDCCH is mapped may be determined. This subframe-set may be configured cell-specifically by SIB, or may be configured UE-specifically by RRC. Alternatively, the subframe-set may be configured CE-level specifically through SIB and/or RRC.

If N-PDCCH monitoring subframe-set includes X' number of subframes, REG may be mapped in a unit of X' number of subframes. For example, REG may be mapped like the 'REG configuration method 2' or 'REG configuration method 3' suggested in the section D in a unit of X' number of subframes. At this time, in the 'REG configuration method 2' or 'REG configuration method 3', X should be replaced with X'.

One CCE may be configured using a plurality of REGs (e.g., 9 REGs) among REGs defined within N-PDCCH monitoring subframe-set that includes X' number of subframes. For example, if 136 REGs exist within the X' subframes, 9 REGs of the 136 REGs may configure one CCE. REG resource configuring one CCE may include non-consecutive REGs, which are determined by a specific interleaving equation, among a total of REG resources existing within the X' subframes.

In order to transmit EPDCCH of which resource mapping is performed for the existing 2, 4 or 8 PRB regions in an NB-IoT environment where only one PRB exists, if EPDCCH set $X_m$ (that is, the aforementioned EPDCCH set $S_p$) meant by the existing ECCE to EREG mapping equation is applied to N-PDCCH, the EPDCCH set $X_m$ may be changed to mean a subframe-set which is a subframe resource to which N-PDCCH is mapped. N-PDCCH resource mapping is performed for a plurality of subframes not a plurality of PRBs. At this time, one subframe may include one PRB region in a frequency domain.

In this case, RB size $N^{Xm}_{RB}$ (corresponding to the aforementioned $N^{Sp}_{RB}$) of the EPDCCH set $X_m$ may be replaced with $N^{Xm}_{SF}$ that means the number of subframes configuring N-PDCCH subframe set $X_m$. The existing ECCE to EREG mapping method for EPDCCH may be changed for N-PDCCH as follows.

Within N-PDCCH set $X_m$ in subframe i, the ECCEs available for transmission of N-PDCCHs are numbered from 0 to $N_{ECCE,m,i}-1$ and ECCE number n corresponds to
EREGs numbered (n mod $N^{RB}_{ECCE}$)+j·$N^{RB}_{ECCE}$ in subframe index floor(n/$N^{RB}_{ECCE}$)

where j=0, 1, . . . , $N^{ECCE}_{EREG}-1$, $N^{ECCE}_{EREG}$ is the number of EREGs per ECCE, and $N^{RB}_{ECCE}=16/N^{ECCE}_{EREG}$ is the number of ECCEs per resource-block pair. The physical resource-block pairs constituting N-PDCCH set $X_m$ are in this paragraph assumed to be numbered in ascending order from 0 to $N^{Xm}_{SF}-1$.

Alternatively, the existing ECCE to EREG mapping method for EPDCCH may be changed as follows.

Within N-PDCCH set $X_m$ in subframe i, the ECCEs available for transmission of N-PDCCHs are numbered from 0 to $N_{ECCE,m,i}-1$ and ECCE number n corresponds to
EREGs numbered 'floor(n/$N^{Xm}_{SF}$)+j·$N^{RB}_{ECCE}$ in subframe indices '(n+j·max(1, $N^{Xm}_{SF}/N^{ECCE}_{EREG}$)) mod $N^{Xm}_{SF}$, where j=0, 1, . . . , $N^{ECCE}_{EREG}-1$, $N^{ECCE}_{EREG}$ is the number of EREGs per ECCE, and $N^{RB}_{ECCE}=16/N^{ECCE}_{EREG}$ is the number of ECCEs per resource-block pair. The physical resource-block pairs constituting N-PDCCH set $X_m$ are in this paragraph assumed to be numbered in ascending order from 0 to $N^{Xm}_{SF}-1$.

Considering that the number of subframes to which N-PDCCH is mapped is not a multiple of $N^{ECCE}_{EREG}$, subframe indices '(n+j·max(1, $N^{Xm}_{SF}/N^{ECCE}_{EREG}$)) mod $N^{Xm}_{SF}$' may be changed to '(n+j·max(1, floor($N^{Xm}_{SF}/N^{ECCE}_{EREG}$))) mod $N^{Xm}_{SF}$', '(n+j·max(1, ceil($N^{Xm}_{SF}/N^{ECCE}_{EREG}$))) mod $N^{Xm}_{SF}$', '(n+floor(j·max(1, $N^{Xm}_{SF}/N^{ECCE}_{EREG}$))) mod $N^{Xm}_{SF}$', or '(n+ceil(j·max(1, $N^{Xm}_{SF}/N^{ECCE}_{EREG}$))) mod $N^{Xm}_{SF}$'.

CCE Configuration Method 3

For multiplexing of N-PDCCHs for different UEs within one PRB, the N-PDCCHs may be transmitted by frequency division multiplexing (FDM). In this case, the N-PDCCHs for different UEs may be transmitted through different subcarrier regions. For example, when a total of 12 subcarriers exist, N-PDCCH for UE1 may be transmitted within subcarriers #0 to #5, and N-PDCCH for UE2 may be transmitted within subcarriers #6 to #11. To this end, REs configuring one EREG may be configured to be exist within only some subcarrier region within one PRB where the UE performs monitoring.

CCE Configuration Method 4

One CCE for N-PDCCH may include S number of subcarrier resources within one or a plurality of subframes. For example, one CCE may include 4 subcarriers or 6 subcarriers. Referring to FIG. 12, for example, the CCE may include S=4 consecutive subcarrier resources within X=4 subframes.

In this case, as suggested in the 'N-PDCCH transmission without REG concept' in the section D, the N-PDCCH may be transmitted without the concept of REG. For example, the N-PDCCH may be transmitted in such a manner that one SFBC pair for the N-PDCCH may be mapped to 2 consecutive REs configuring N-PDCCH transmission resource in the order of frequency first and time second within a CCE(s) resource region within which the N-PDCCH is transmitted.

CCE Configuration Method 5

For subframe-level multiplexing between control channels or between a control channel and a data channel, as shown in FIG. 11, N-PDCCH monitoring subframe-set for monitoring N-PDCCH by a UE within a subframe unit where N-PDCCH is repeated, that is, a subframe unit to which N-PDCCH is mapped may be determined. This subframe-set may be configured cell-specifically by SIB, or may be configured UE-specifically by RRC. Alternatively, the subframe-set may be configured CE-level specifically through SIB and/or RRC.

If N-PDCCH monitoring subframe-set includes X' number of subframes, one CCE may include S=4 consecutive subcarrier resources within X'=4 subframes.

In this case, as suggested in the 'N-PDCCH transmission without REG concept' in the section D, the N-PDCCH may be transmitted without the concept of REG. For example, the N-PDCCH may be transmitted in such a manner that one SFBC pair for the N-PDCCH may be mapped to 2 consecutive REs configuring N-PDCCH transmission resource in the order of frequency first and time second within a CCE(s) resource region within which the N-PDCCH is transmitted.

CCE Configuration Method 6

One CCE for N-PDCCH may include M number of subframe resources within a plurality of subframes (e.g., X subframes). For example, one CCE may include M=1 or M=4 subframes. For example, as shown in FIG. 13, the CCE may include M=4 consecutive subframes within X=12 subframes.

In this case, as suggested in the 'N-PDCCH transmission without REG concept' in the section D, the N-PDCCH may be transmitted in such a manner that one SFBC pair for the N-PDCCH may be mapped to 2 consecutive REs configuring N-PDCCH transmission resource in the order of frequency first and time second within a CCE(s) resource region to which the N-PDCCH is transmitted.

Alternatively, REG mapping for the N-PDCCH may assume 'REG configuration method 1', 'REG configuration method 2' or 'REG configuration method 3' as suggested in the section D. In this case, all REGs within M number of subframes, which participate in configuration of CCE, may be used to configure one CCE.

CCE Configuration Method 7

For subframe-level multiplexing between control channels or between a control channel and a data channel, as shown in FIG. 11, N-PDCCH monitoring subframe-set for monitoring N-PDCCH by means of a UE may be determined within a subframe unit where N-PDCCH is repeated, that is, a subframe unit to which N-PDCCH is mapped. This subframe-set may be configured cell-specifically by SIB, or may be configured UE-specifically by RRC. Alternatively, the subframe-set may be configured CE-level specifically through SIB and/or RRC.

If N-PDCCH monitoring subframe-set includes X' number of subframes, one CCE may include M subframe resources within a plurality of subframes (e.g., X subframes). For example, one CCE may include M=1 or M=4 subframes. For example, as shown in FIG. 13, the CCE may include M=4 consecutive subframes within X=12 subframes.

In this case, as suggested in the 'N-PDCCH transmission without REG concept' in the section D, the N-PDCCH may be transmitted without the concept of REG. For example, the N-PDCCH may be transmitted in such a manner that one SFBC pair for the N-PDCCH may be mapped to 2 consecutive REs configuring N-PDCCH transmission resource in the order of frequency first and time second within a CCE(s) resource region within which the N-PDCCH is transmitted.

Alternatively, REG mapping for the N-PDCCH may assume 'REG configuration method 1', 'REG configuration method 2' or 'REG configuration method 3' as suggested in the section D. In this case, all REGs within M number of subframes, which participate in configuration of CCE, may be used to configure one CCE.

<F. NB-IoT PDCCH Transmission in Multiple Subcarriers>

N-PDCCH Subcarrier Resource in a Subframe

In an NB-IoT environment where N-PDCCH is transmitted over a plurality of subframes within a narrow bandwidth of 180 KHz, RE mapping method of a legacy EPDCCH may not be used. Instead, for multiplexing of N-PDCCH within subframes, the N-PDCCH may be transmitted using some subcarrier regions only.

FIGS. 14 to 17 illustrate transmission resources of N-PDCCH according to the present invention in view of subcarriers.

When the N-PDCCH is transmitted, the N-PDCCH may be transmitted using K number of subcarriers, wherein one or multiple values may be used as K. For example, when K1, K2, and K3 may be used as the value of K, the N-PDCCH may be transmitted through K1, K2 or K3 number of subcarriers. For example, K which is the number of subcarriers used for transmission of the N-PDCCH may be one of 1, 2, 4, 6 and 12. As shown in FIG. 14, one N-PDCCH may be transmitted through a plurality of subcarriers, and different N-PDCCHs may be transmitted by being multiplexed within one subframe by using different subcarrier regions.

In more detail, a plurality of subcarrier resources within which N-PDCCH may be transmitted may exist, and a plurality of transmission resource regions may exist for each of the plurality of subcarrier resources. For example, when the number of subcarrier resources is 2, a total of 6 N-PDCCH transmission resource regions (that is, N-PDCCH candidates) may exist, and the m-th transmission resource region (N-PDCCH resource m) may include subcarriers #2m and #2m+1 (in this case, m=0, 1, 2, 3, 4, 5).

That is, RE resource configuring ECCE #n may be the same as RE resources located at the n-th subcarrier within the subcarrier resources within which the N-PDCCH may be transmitted. In this case, an aggregation level (AL) means the number of subcarriers used for transmission of the N-PDCCH.

The N-PDCCH may be transmitted through any number of subcarrier resources and a transmission resource region (e.g. N-PDCCH candidate index) of the N-PDCCH which are determined by an eNB. At this time, a UE may attempt reception of the N-PDCCH through blind detection for the number of subcarrier resources with which the N-PDCCH may be transmitted and the transmission resource region of the N-PDCCH without knowing the number of subcarrier resources with which the N-PDCCH is transmitted and the transmission resource region of the N-PDCCH.

Meanwhile, to reduce the number of subframes where the N-PDCCH is repeated by maximizing the subcarrier region within which the N-PDCCH is transmitted while enabling multiplexing between the N-PDCCHs or multiplexing between the N-PDCCH and the PDSCH, the number (that is, AL) of subcarrier resources used for transmission of the N-PDCCH may be limited to some large values. For example, the number of subcarrier resources used for transmission of the N-PDCCH may be limited to 4 subcarriers, 8 subcarriers and 12 subcarriers.

At this time, the location of 4 subcarrier resources, 8 subcarrier resources and 12 subcarrier resources, which are used for transmission of each N-PDCCH, may be as follows.

Option A. There may be locations of N-PDCCH resources, that is, N-PDCCH candidates, with 4 subcarriers, 8 subcarriers or 12 subcarriers may exist within a narrowband of one PRB. Referring to FIG. 14(a), the N-PDCCH transmitted with 4 subcarriers may be transmitted through 4 subcarriers from subcarrier of a minimum index (or from subcarrier of a maximum index) within NB-IoT narrowband of one PRB, and the N-PDCCH transmitted with 8 subcarriers may be transmitted through 8 subcarriers from subcarrier of a maximum index (or from subcarrier of a minimum index) within NB-IoT narrowband of one PRB. The N-PDCCH transmitted with 12 subcarriers may be transmitted through all subcarrier resources within the NB-IoT narrowband of one PRB.

Option B. There may be three locations of N-PDCCH resources, that is, N-PDCCH candidates, transmitted with 4 subcarriers within a narrowband of one PRB, there may be one N-PDCCH candidate transmitted with 8 subcarriers within a narrowband of one PRB, and there may be one N-PDCCH candidate transmitted with 12 subcarriers within a narrowband of one PRB. Referring to FIG. 14(b), the N-PDCCH transmitted with 4 subcarriers may be transmitted with subcarriers #0 to #3, subcarriers #4 to #7, or subcarriers #8 to #11 within NB-IoT narrowband of one PRB. Meanwhile, the N-PDCCH transmitted with 8 subcarriers may be transmitted through 4 subcarriers from subcarrier of a maximum index (or from subcarrier of a minimum index) within NB-IoT narrowband of one PRB. The N-PDCCH transmitted by 12 subcarriers may be transmitted through all subcarrier resources within the NB-IoT narrowband of one PRB.

Option C. There may be three locations of N-PDCCH resources, that is, N-PDCCH candidates, transmitted with 4 subcarriers within a narrowband of one PRB, there may be two N-PDCCH candidates transmitted with 8 subcarriers within a narrowband of one PRB, and there may be one N-PDCCH candidate transmitted with 12 subcarriers within a narrowband of one PRB. Referring to FIG. 14(c), the N-PDCCH transmitted with 4 subcarriers may be transmitted through subcarriers #0 to #7 or subcarriers #4 to #11 within the NB-IoT narrowband of one PRB. The N-PDCCH transmitted by 12 subcarriers may be transmitted through all subcarrier resources within the NB-IoT narrowband of one PRB.

A resource region within which a PDSCH of NB-IoT as well as N-PDCCH can be transmitted may be limited to the suggested resource region. At this time, the resource region within which a PDSCH is transmitted may be notified through DCI or may be notified to the UE through higher-layer (e.g., RRC) signaling.

Alternatively, to locate RE at which one SFBC pair is transmitted for SFBC transmission at the same OFDM symbol while enabling multiplexing between the N-PDCCHs or multiplexing between the N-PDCCH and the PDSCH, the number of subcarrier resources at which the N-PDCCH is transmitted may be limited to 6 subcarriers and/or 12 subcarriers. That is, one CCE for the N-PDCCH may include one subcarrier or 6 subcarriers, and if one CCE includes one subcarrier, AL 6 and AL 12 may be supported, and if ECCE includes 6 subcarriers, AL 1 and AL 2 may be supported.

The location of the subcarrier resource to which each N-PDCCH transmitted through 6 or 12 subcarriers is transmitted may be as follows.

Option A'. There may be one location of N-PDCCH resource, that is, N-PDCCH candidate, transmitted with 6 subcarriers and one N-PDCCH candidate transmitted with 12 subcarriers within a narrowband of one PRB. At this time, N-PDCCH transmitted with 6 subcarriers may be transmitted through 6 subcarriers from subcarrier of a minimum index (or from subcarrier of a maximum index) within NB-IoT narrowband of one PRB, and the N-PDCCH transmitted with 12 subcarriers may be transmitted through all subcarrier resources within NB-IoT narrowband of one PRB. In this case, when two CCEs for the N-PDCCH exist within one PRB pair, CCE #0 may include resources corresponding to subcarriers #0 to #5 within one PRB pair, and CCE #1 may include resources corresponding to subcarriers #6 to #11 within the one PRB pair. Even though two CCEs exist, according to the option A', one decoding candidate corresponding to an aggregation level (AL)=1 may exist.

Option B'. There may be two locations of N-PDCCH resources, that is, N-PDCCH candidates, transmitted with 6 subcarriers within a narrowband of one PRB, and one N-PDCCH candidate transmitted with 12 subcarriers within a narrowband of one PRB. At this time, N-PDCCH transmitted with 6 subcarriers may be transmitted through subcarriers #0 to #5 or subcarriers #6 to #11 within NB-IoT narrowband of one PRB, and the N-PDCCH transmitted with 12 subcarriers may be transmitted through all subcarrier resources within NB-IoT narrowband of one PRB. When two CCEs for the N-PDCCH exist within one PRB pair, as shown in FIG. 15, CCE #0 may include resources corresponding to the subcarriers #0 to #5 within one PRB pair, and CCE #1 may include resources corresponding to the subcarriers #6 to #11 within the one PRB pair.

Option C'. When two CCEs exist within one PRB pair, as shown in FIG. 16(a), one CCE may include resources corresponding to subcarriers #0 to #5 at even-numbered OFDM symbols (e.g., OFDM symbols #0, #2, #4, #6, #8, #10 and #12) within one PRB pair, and may include resources corresponding to subcarriers #6 to #11 at odd numbered OFDM symbols (e.g., OFDM symbols #1, #3, #5, #7, #9, #11 and #13) within one PRB pair. Another CCE may include resources corresponding to subcarriers #0 to #5 at odd-numbered OFDM symbols within one PRB pair, and may include resources corresponding to subcarriers #6 to #11 at even-numbered OFDM symbols within one PRB pair.

Option D'. When two CCEs exist within one PRB pair, as shown in FIG. 16(b), one CCE may include resources corresponding to subcarriers #0 to #5 at OFDM symbols #0, #1, #4, #5, #8, #9, #12 and #13 within one PRB pair, and may include resources corresponding to subcarriers #6 to #11 at OFDM symbols #2, #3, #6, #7, #10 and #11 within one PRB pair. Another CCE may include resources corresponding to subcarriers #0 to #5 at OFDM symbols #2, #3, #6, #7, #10 and #11 within one PRB pair, and may include resources corresponding to subcarriers #6 to #11 at OFDM symbols #0, #1, #4, #5, #8, #9, #12 and #13 within one PRB pair.

Option E'. When two CCEs exist within one PRB pair, as shown in FIG. 16(c), one CCE may include resources corresponding to subcarriers #0 to #5 at the first slot within one PRB pair, and may include resources corresponding to subcarriers #6 to #11 at the second slot within one PRB pair. Another CCE may include resources corresponding to subcarriers #0 to #5 at the second slot within one PRB pair, and may include resources corresponding to subcarriers #6 to #11 at the first slot within one PRB pair.

Alternatively, considering OFDM symbol(s) in which a legacy PDCCH is transmitted, one CCE may include resources corresponding to subcarriers #0 to #5 at OFDM symbols corresponding to a front half among OFDM symbols from an OFDM symbol starting with transmission of the N-PDCCH to the last OFDM symbol of a subframe, and may include resources corresponding to subcarriers #6 to #11 at OFDM symbols corresponding to a rear half among the OFDM symbols. Another CCE may include resources corresponding to subcarriers #6 to #11 at OFDM symbols corresponding to a front half among OFDM symbols from an OFDM symbol starting with transmission of the N-PDCCH to the last OFDM symbol of a subframe, and may include resources corresponding to subcarriers #0 to #5 at OFDM symbols corresponding to a rear half among the OFDM symbols.

Option F'. When two CCEs exist within one PRB pair, as shown in FIGS. 16(d) and 16(e), one CCE may include subcarriers #0, #1, #2, #6, #7 and #8 or subcarriers #3, #4, #5, #9, #10 and #11 at OFDM symbol(s) in which a legacy CRS and/or a demodulation reference signal (DMRS) of N-PDCCH are transmitted, and may include subcarriers #0, #1, #4, #5, #8 and #9 or subcarriers #2, #3, #6, #7, #10 and #11 at OFDM symbol(s) in which a legacy CRS and/or a DMRS of N-PDCCH (hereinafter, N-PDCCH DMRS) are not transmitted. FIGS. 16(d) and 16(e) illustrate resources configuring each ECCE (=CCE) when a legacy CRS is transmitted in OFDM symbols #0, #4, #7 and #11 and N-PDCCH DMRS is transmitted in OFDM symbols #5, #6, #12 and #13. For example, as shown in FIG. 16(d), CCE #0 may include subcarriers #0, #1, #2, #6, #7 and #8 at OFDM symbol in which a legacy CRS and/or N-PDCCH DMRS is transmitted, and may include subcarriers #0, #1, #4, #5, #8 and #9 at OFDM symbol in which a legacy CRS and/or N-PDCCH DMRS is not transmitted, and CCE #1 may include subcarriers #3, #4, #5, #9, #10 and #11 at OFDM symbol in which a legacy CRS and/or N-PDCCH DMRS is transmitted, and may include subcarriers #2, #3, #6, #7, #10 and #11 at OFDM symbol in which a legacy CRS and/or N-PDCCH DMRS is not transmitted.

Alternatively, as shown in FIG. 16(e), CCE #0 may include subcarriers #0, #1, #2, #6, #7 and #8 at even-numbered OFDM symbols (e.g., OFDM symbols #0, #4, #6 and #12) in which a legacy CRS and/or N-PDCCH DMRS is transmitted, may include subcarriers #3, #4, #5, #9, #10 and #11 at odd-numbered OFDM symbols (e.g., OFDM symbols #5, #7, #11 and #13) in which a legacy CRS and/or N-PDCCH DMRS is transmitted, may include subcarriers #0, #1, #4, #5, #8 and #9 at even-numbered OFDM symbols (e.g., OFDM symbols #2, #8 and #10) in which a legacy CRS and/or N-PDCCH DMRS is not transmitted, and may include subcarriers #2, #3, #6, #7, #10 and #11 at odd-numbered OFDM symbols (e.g., OFDM symbols #1, #3 and #9) in which a legacy CRS and/or N-PDCCH DMRS is not transmitted. CCE #1 may include subcarriers #0, #1, #2, #6, #7 and #8 at odd-numbered OFDM symbols in which a legacy CRS and/or N-PDCCH DMRS is transmitted, may include subcarriers #3, #4, #5, #9, #10 and #11 at even-numbered OFDM symbols in which a legacy CRS and/or N-PDCCH DMRS is transmitted, may include subcarriers #0, #1, #4, #5, #8 and #9 at odd-numbered OFDM symbols in which a legacy CRS and/or N-PDCCH DMRS is not transmitted, and may include subcarriers #2, #3, #6, #7, #10 and #11 at even-numbered OFDM symbols in which a legacy CRS and/or N-PDCCH DMRS is not transmitted.

When N-PDCCH is transmitted, the N-PDCCH may be rate-matched at RE available at a legacy CRS and/or N-PDCCH DMRS within a resource region for transmission of the N-PDCCH.

When two CCEs exist within one PRB pair, a PDSCH may be transmitted through RE resource configuring N-PDCCH (E)CCE #0 within a PRB pair, RE resource configuring N-PDCCH (E)CCE #1 within a PRB pair, and/or all RE resources within a PRB pair. In this case, indication as to a resource through which a PDSCH is transmitted may be configured through DCI or RRC signal.

In case of N-PDCCH transmission with large repetitions (e.g., 164 dB target MCL (minimum coupling loss)), it needs to utilize all resources during N-PDCCH transmission to reduce N-PDCCH reception time at a UE and UE power consumption. However, when N-PDCCH is transmitted using small repetitions or no repetition, N-PDCCH transmission using only a part of subcarriers within a subframe can be considered to reduce resource waste and support scheduling flexibility. For example, when CCE #0 of subcarriers #0 to #5 and CCE #1 of subcarriers #6 to #11 exist within one PRB pair, N-PDCCH to which (large) repetitions are applied may be transmitted by aggregation of CCE #0 and CCE #1, and N-PDCCH to which repetition is not applied may be transmitted using one of CCE #0 and CCE #1. If N-PDCCH transmission is configured to be repeated at large repetitions, the UE may attempt to decode N-PDCCH candidate only, which is comprised of CCE #0 and CCE #1, without attempting to decode N-PDCCH candidate comprised of CCE #0 and N-PDCCH candidate comprised of CCE #1. If N-PDCCH transmission is configured as no repetition, that is, repetition of one time 1 (or small repetitions), the UE may attempt to decode N-PDCCH candidate comprised of CCE #0 and/or N-PDCCH candidate comprised of CCE #1.

N-PDCCH Subcarrier Resources within a Plurality of Subframes

N-PDCCH may be transmitted through a specific number of subcarriers in a frequency domain, and may be transmitted through a region of a plurality of subframes on a time axis. The N-PDCCH may be transmitted in such a manner that M number of subframes to which the N-PDCCH is mapped are repeated R times on a time axis, after RE mapping of the N-PDCCH is performed for a resource region of the M subframes. In this case, the N-PDCCH is finally transmitted through M*R number of subframes.

At this time, the present invention suggests subcarrier resources at each subframe, in which N-PDCCH is transmitted.

Option 1. N-PDCCH may be transmitted through the same subcarrier resource within a total of M*R subframes in which the N-PDCCH is transmitted. That is, the N-PDCCH may be transmitted using subcarrier resources of the same amount and the same location. In other words, the subcarrier resources at the respective M*R subframes are the same as each other. For example, if the N-PDCCH is transmitted through subcarriers #0 to #5 at the first subframe of the M*R subframes, the N-PDCCH is transmitted through the subcarriers #0 to #5 even at the other subframes.

Option 2. N-PDCCH may be transmitted through different subcarrier resources every subframe within a total of M*R subframes in which the N-PDCCH is transmitted. For example, although the amount of subcarrier resources at which the N-PDCCH is transmitted is maintained equally within the M*R subframes, the location of the subcarrier resources at which the N-PDCCH is transmitted every subframe may be varied within a bandwidth on which the N-PDCCH is transmitted. That is, although the number of subcarriers used for transmission of the N-PDCCH is not varied within the M*R subframes, subcarrier indices used for transmission of the N-PDCCH may be varied every subframe within the M*R subframes. At this time, a hopping pattern of subcarriers of the N-PDCCH within a channel bandwidth may be defined previously, or may be configured for the UE in order to reduce blind detection complexity of the UE.

Option 3. N-PDCCH may be transmitted through the same subcarrier region within M number of subframes corresponding to a subframe unit at which resource mapping of the N-PDCCH is performed, or may be transmitted through different subcarrier resources in a unit of M number of subframes. For example, as shown in FIG. 17, although the amount of subcarrier resources at which the N-PDCCH is transmitted, that is, the number of subcarriers is not varied within the M*R subframes even though the number of subframes is varied, the location of the subcarrier resources used for transmission of the N-PDCCH in a unit of M number of subframes (e.g., 4 subframes) may be varied within a bandwidth on which the N-PDCCH is transmitted. At this time, a hopping pattern of subcarriers of the N-PDCCH within a channel bandwidth may be defined previously, or may be configured for the UE in order to reduce blind detection complexity of the UE.

Option 4. N-PDCCH may be transmitted through the same subcarrier region within X number of subframes, or may be transmitted through different subcarrier resources in a unit of X number of subframes. For example, although the amount of subcarrier resources at which the N-PDCCH is transmitted, is not varied within the X subframes, the location of the subcarrier resources at which the N-PDCCH is transmitted may be varied per X subframes within a bandwidth on which the N-PDCCH is transmitted. A value of X may be the same as M*R*a (in this case, a is an integer greater than 0). Also, the value of X or a value of a may be defined previously, or may be configured for a UE by an eNB through SIB or RRC signal. At this time, a hopping pattern of subcarriers of the N-PDCCH within a channel bandwidth may be defined previously, or may be configured for the UE in order to reduce blind detection complexity of the UE.

The eNB may configure, for the UE, whether a subcarrier location at which the N-PDCCH is transmitted will be maintained equally or subjected to hopping within a total of M*R subframes in which the N-PDCCH is transmitted, through SIB or RRC signaling.

<G. NB-IoT PDCCH Transmission in Slot(s)>

FIG. 18 illustrates time axis transmission resources of N-PDCCH according to the present invention.

For multiplexing of the N-PDCCH within a subframe, the N-PDCCH may be transmitted using some slots only. When the N-PDCCH is transmitted, the N-PDCCH may be transmitted using one or all slots (e.g., two slots) within the subframe. As shown in FIG. 18, one N-PDCCH may be transmitted through one or all slots, and different N-PDCCHs may be transmitted by being multiplexed within one subframe by using different slots.

At this time, a location of slot resources in which each N-PDCCH is transmitted may be as follows.

Option A. There may be one location of N-PDCCH resource, that is, N-PDCCH candidate, transmitted with one slot or two slots within a narrowband of one PRB. N-PDCCH transmitted with one subcarrier may be transmitted within a first slot (or a second slot), and N-PDCCH transmitted with two subcarriers may be transmitted over all slot resources within subframes on NB-IoT narrowband of one PRB.

Option B. There may be two locations of N-PDCCH resources, that is, N-PDCCH candidates, transmitted with one slot within a narrowband of one PRB, and one N-PDCCH transmitted with two slots within a narrowband of one PRB. At this time, N-PDCCH transmitted with one slot, that is, N-PDCCH transmitted using one slot may be transmitted through either a first slot or a second slot within NB-IoT narrowband of one PRB, and N-PDCCH transmitted with two slots may be transmitted over the two slots on NB-IoT narrowband of one PRB.

In case of N-PDCCH transmission with large repetitions (e.g., 164 dB target MCL), it needs to utilize all resources during N-PDCCH transmission to reduce N-PDCCH reception time and UE power consumption. However, when N-PDCCH is transmitted using small repetitions or no repetition, N-PDCCH transmission using only a part of slots within a subframe can be considered to reduce resource waste and support scheduling flexibility. For example, when slot #0 and slot #1 exist within a subframe on one PRB pair, N-PDCCH to which (large) repetitions are applied may be transmitted over the slot #0 and the slot #1, and N-PDCCH to which repetition is not applied may be transmitted using one of CCE #0 and CCE #1. If N-PDCCH transmission is configured to be repeated (at large repetitions), the UE may attempt to decode N-PDCCH candidate only configured using both slot #0 and slot #1, without attempting to decode N-PDCCH candidate configured within slot #0 and N-PDCCH candidate configured within slot #1. If N-PDCCH transmission is configured as no repetition, that is, repetition of one time 1 (or small repetitions), the UE may attempt to decode N-PDCCH candidate within slot #0 and/or N-PDCCH candidate within slot #1.

<H. DMRS for N-PDCCH>

The present invention suggests a reference signal (RS) used by a UE for demodulation of N-PDCCH. In case of a legacy EPDCCH, a DMRS within PRB(s) to which a resource at which EPDCCH is transmitted belongs is used for demodulation of the EPDCCH. Hereinafter, if the N-PDCCH is transmitted using some subcarriers within a bandwidth in which NB-IoT operates or some subcarriers within one PRB, RS resources used for demodulation of the N-PDCCH will be suggested.

The suggestion of the present invention with respect to RS resources may equally be applied to determination of DMRS resources used for demodulation of PDSCH/PUSCH as well as N-PDCCH. The DMRS mentioned in the present invention may be RS having a sequence/RE location of the legacy DMRS, or may be RS having another sequence/RE location. The DMRS may be the same as the legacy CRS. Alternatively, the sequence/RE location of the DMRS may be cell-specific.

Alt 1. Use of DMRS within Subcarriers for N-PDCCH Transmission

A UE may use DMRS only, which is transmitted within subcarrier(s) at which N-PDCCH is transmitted, for demodulation of the N-PDCCH. That is, the DMRS may be transmitted within the subcarrier only, at which the N-PDCCH is transmitted, by using RS sequence used by the corresponding UE. Also, the DMRS may be transmitted within the subcarrier only, at which the N-PDCCH is transmitted, by using the same precoding matrix and/or precoding pattern as that of the corresponding N-PDCCH.

Alt 2. DMRS within Subcarrier to which N-PDCCH can be Transmitted

A UE may use DMRS only, which is transmitted within subcarrier(s) at which N-PDCCH can be transmitted, for demodulation of the N-PDCCH. The subcarrier(s) to which the N-PDCCH can be transmitted may mean a subcarrier region where a UE monitors N-PDCCH, that is, a subcarrier region constituting an N-PDCCH search space. That is, the DMRS may be transmitted within the subcarrier only, at which the N-PDCCH can be transmitted, by using RS sequence used by the corresponding UE. Also, the DMRS may be transmitted within the subcarrier(s) only, at which the N-PDCCH can be transmitted, by using the same precoding matrix and/or precoding pattern as that of the corresponding N-PDCCH.

Alt 3. DMRS within NB-IoT Bandwidth (or NB-IoT Narrowband)

A UE may use DMRS, which is transmitted within NB-IoT bandwidth (or NB-IoT narrowband) where the UE is operated, for demodulation of the N-PDCCH. That is, the DMRS may be transmitted within the NB-IoT bandwidth (or NB-IoT narrowband) where the UE is operated, by using RS sequence used by the corresponding UE. Also, the DMRS may be transmitted within the NB-IoT bandwidth (or IB-IoT narrowband) where the UE is operated, by using the same precoding matrix and/or precoding pattern as that of the N-PDCCH.

Alt 4. DMRS within N-PDCCH Transmission Subcarrier Group

When NB-IoT bandwidth (or IB-IoT narrowband) or subcarrier(s) region at which N-PDCCH can be transmitted is divided into a plurality of groups, a UE may use DMRS, which is transmitted within subcarrier group(s) to which a subcarrier resource at which the N-PDCCH is transmitted belongs, for demodulation of the N-PDCCH. That is, the DMRS may be transmitted within a subcarrier group only, at which the N-PDCCH is transmitted, by using RS sequence used by the corresponding UE. Also, the DMRS may be transmitted within the subcarrier group only, at which the N-PDCCH is transmitted, by using the same precoding matrix and/or precoding pattern as that of the N-PDCCH.

With respect to a random one of antenna ports p∈{107, 108, 109, 110} for EPDCCH, a reference signal sequence r(m) may be defined by the Math FIG. 3. In this case, pseudo-random sequence c(n) may be defined by the Math FIG. 4. A pseudo-random sequence generator may be initiated at the start of each subframe in accordance with the following equation.

$$c_{init}=(\lfloor n_s/2 \rfloor+1) \cdot (2n_{ID,i}^{EPDCCH}+1) \cdot 2^{16}+n_{SCID}^{EPDCCH} \quad \text{[Math.8]}$$

In Math FIG. 8, $n_{SCID}^{EPDCCH}=2$, and $n_{ID,i}^{EPDCCH}$ is configured by a higher layer. An EPDCCH set to which EPDCCH associated with DMRS belongs is marked with i ∈{0, 1}.

In order that a plurality of UEs share DMRS of N-PDCCH, the same RS sequence should be used by UEs which share the DMRS. To this end, it is suggested that sequence of the DMRS should be initiated by one or some values of the following values.

Physical cell layer identity (PCID) (e.g., $N^{cell}_{ID}$) may substitute for $n_{ID,i}^{EPDCCH}$ of Math FIG. 8.

NB-IoT operation narrowband index: If a plurality of NB-IoT narrowbands exist, DMRS sequence may be varied depending on a narrowband index of NB-IoT at which N-PDCCH is transmitted. In this case, UEs may expect the same DMRS sequence at the same narrowband. At this time, the value of $n_{ID,i}^{EPDCCH}$ of Math FIG. 8, which is used to initiate the DMRS sequence per narrowband, may be configured through SIB and/or higher layer signaling.

N-PDCCH transmission subcarrier group index: When NB-IoT bandwidth (or narrowband) or subcarrier(s) region at which N-PDCCH can be transmitted is divided into a plurality of groups, DMRS sequence may be varied in accordance with subcarrier group index at which the N-PDCCH is transmitted. In this case, UEs may expect the same DMRS sequence at the same subcarrier group. At this time, the value of $n_{ID,i}^{EPDCCH}$ of Math FIG. 8, which is used to initiate the DMRS sequence per subcarrier group, may distinctively be configured through SIB and/or higher layer signaling.

<I. Handling of Invalid Subframe>

As an issue of multiplexing of MBSFN subframe and a legacy UE, some subframe resources of all subframes may be used for downlink transmission or transmission of N-PDCCH/N-PDSCH. In this case, invalid subframes, which cannot be used for transmission of the N-PDCCH, may exist within a total of R subframes in which the N-PDCCH is transmitted. When the N-PDCCH is transmitted through R subframes regardless of invalid/valid subframes, in other words, if a duration of transmission of the N-PDCCH corresponds to R subframes regardless of invalid/valid subframes, the amount of total resources at which the N-PDCCH is transmitted may be varied depending on the number of invalid subframes of the R subframes. If the amount of resources at which the N-PDCCH is transmitted is reduced due to increase of invalid subframes, it is required to transmit the N-PDCCH by using more resources to obtain the same performance.

Therefore, the present invention suggests that an aggregation level (or which a UE monitors N-PDCCH) and/or repetitions, at which N-PDCCH can be transmitted, should be varied in the following cases: for example, the aggregation level and/or repetitions may be increased in case of the following cases as much as twice more than the other cases, In the case that a proportion of valid subframes existing within a total of subframes in which N-PDCCH is transmitted is α (alpha) or less or a proportion of invalid subframes existing within subframes in which N-PDCCH is transmitted is β (beta) or more;

In the case that a proportion of valid subframes existing within a unit of subframe to which N-PDCCH is mapped (that is, DCI is mapped) is a or less or a proportion of invalid subframes existing within a subframe in which N-PDCCH is transmitted is β or more; and In the case that a proportion of invalid subframes existing within 40 or 10 (downlink) subframes is a or less or a proportion of invalid subframes existing within a subframe in which N-PDCCH is transmitted is β or more.

FIG. 19 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may map N-PDCCH to subframes in accordance with any one of the methods suggested in section A and section G. The eNB processor may control the eNB RF unit to transmit the N-PDCCH to the corresponding UE at the subframe(s) to which the N-PDCCH is mapped. The UE processor of the present invention may control the UE RF unit to attempt to receive N-PDCCH or receive N-PDCCH at subframes in accordance with any one of the methods suggested in section A and section G.

The eNB processor of the present invention may configure N-PDCCH, N-PDCCH search space or each decoding candidate in accordance with any one of the methods suggested in section B, section C, section D, section E and section F. The eNB processor may control the eNB RF unit to transmit the N-PDCCH through one of decoding candidates within the N-PDCCH search space configured in accordance with any one of the methods suggested in section B, section C, section D, section E and section F. The eNB processor may configure CCE configuring N-PDCCH in accordance with any one of the methods suggested in section D, section E and section F. The eNB processor may control the eNB RF unit to transmit the N-PDCCH by aggregation of one CCE or two or more CCEs configured in accordance with any one of the methods suggested in section D, section E and section F. The UE processor of the present invention may monitor the N-PDCCH, the N-PDCCH search space or each decoding candidate in accordance with any one of the methods suggested in section B, section C, section D, section E and section F. The UE processor may control the UE RF unit to attempt to receive the N-PDCCH or receive the N-PDCCH by attempting decoding for decoding candidates within the N-PDCCH search space configured in accordance with any one of the methods suggested in section B, section C, section D, section E and section F. The UE processor may assume that CCE configuring N-PDCCH is configured in accordance with any one of the methods suggested in section D, section E and section F. The UE processor may control the UE RF unit to receive the N-PDCCH by aggregation of one CCE or two or more CCEs configured in accordance with any one of the methods suggested in section D, section E and section F.

The eNB processor of the present invention may control the eNB RF unit to transmit RS (hereinafter, N-PDCCH DMRS) for demodulation of the N-PDCCH in accordance with any one of the methods suggested in section H. The UE processor of the present invention may control the UE RF unit to receive RS (hereinafter, N-PDCCH DMRS) for demodulation of the N-PDCCH in accordance with any one of the methods suggested in section H. The UE processor may be configured to demodulate the N-PDCCH by using the N-PDCCH DMRS.

The eNB processor of the present invention may be configured to process invalid subframes within a time interval in which the N-PDCCH is transmitted, in accordance with any one of the methods suggested in section I. The UE processor of the present invention may be configured to process N-PDCCH signal received within the time interval of the N-PDCCH by assuming that invalid subframes are processed within the time interval in which the N-PDCCH is transmitted, in accordance with any one of the methods suggested in section I.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for receiving a signal by a user equipment (UE) in narrowband internet of things (NB-IoT), the method comprising:
   receiving, by the UE, a narrowband physical downlink control channel (N-PDCCH) carrying downlink control information (DCI); and
   receiving, by the UE, a physical downlink shared channel (PDSCH) based on the DCI,
   wherein a channel bandwidth of the NB-IoT is limited to 200 kHz and comprising 1 resource block (RB) which comprises 12 subcarriers in a frequency domain,
   wherein the N-PDCCH is received based on at least one of two control channel elements (CCEs) on the 1 RB,
   wherein a first CCE of the two CCEs occupies 6 subcarriers with indices from 0 to 5 among the 12 subcarriers and a second CCE of the two CCEs occupies 6 subcarriers with indices from 6 to 11 among the 12 subcarriers, and
   wherein the N-PDCCH is received based on monitoring a N-PDCCH candidate configured with the two CCEs in case that the N-PDCCH is received with repetition.

2. The method of to claim 1, wherein the N-PDCCH is received based on monitoring a N-PDCCH candidate configured with the first CCE and a N-PDCCH candidate configured with the second CCE in case that the N-PDCCH is received with no repetition.

3. The method of claim 1, wherein each of the first and second CCEs has no resource element group (REG) mapped to a corresponding CCE.

4. The method of claim 1, wherein the N-PDCCH is rate-matched within a reference signal resource on the RB.

5. A method for transmitting a signal by a base station (BS) in narrowband internet of things (NB-IoT), the method comprising:
   transmitting, to a user equipment (UE), a narrowband physical downlink control channel (N-PDCCH) carrying downlink control information (DCI); and
   transmitting, to the UE, a physical downlink shared channel (PDSCH) based on the DCI,
   wherein a channel bandwidth of the NB-IoT is limited to 200 kHz and comprising 1 resource block (RB) which comprises 12 subcarriers in a frequency domain,
   wherein the N-PDCCH is transmitted based on at least one of two control channel elements (CCEs) on the 1 RB,
   wherein a first CCE of the two CCEs occupies 6 subcarriers with indices from 0 to 5 among the 12 subcarriers and a second CCE of the two CCEs occupies 6 subcarriers with indices from 6 to 11 among the 12 subcarriers, and wherein the N-PDCCH is transmitted based on a N-PDCCH candidate configured with the two CCEs in case that the N-PDCCH is transmitted with repetition.

6. The method of claim 5, wherein the N-PDCCH is transmitted based on a first N-PDCCH candidate configured with the first CCE or a second N-PDCCH candidate configured with the second CCE in case that the N-PDCCH is transmitted with no repetition.

7. The method of claim 5, wherein each of the first and second CCEs has no resource element group (REG) mapped to a corresponding CCE.

8. The method of claim 5, wherein the N-PDCCH is rate-matched within a reference signal resource on the RB.

9. A user equipment (UE) for receiving a signal in narrowband internet of things (NB-IoT), the UE comprising:
  a memory; and
  at least one processor coupled with the memory and configured to:
  receive, by the UE, a narrowband physical downlink control channel (N-PDCCH) carrying downlink control information (DCI); and
  receive, by the UE, a physical downlink shared channel (PDSCH) based on the DCI,
  wherein a channel bandwidth of the NB-IoT is limited to 200 kHz and comprising 1 resource block (RB) which comprises 12 subcarriers in a frequency domain,
  wherein the N-PDCCH is received based on at least one of two control channel elements (CCEs) on the 1 RB,
  wherein a first CCE of the two CCEs occupies 6 subcarriers with indices from 0 to 5 among the 12 subcarriers and a second CCE of the two CCEs occupies 6 subcarriers with indices from 6 to 11 among the 12 subcarriers, and
  wherein the N-PDCCH is received based on monitoring a N-PDCCH candidate configured with the two CCEs in case that the N-PDCCH is received with repetition.

10. The UE of claim 9, wherein the N-PDCCH is received based on monitoring a N-PDCCH candidate configured with the first CCE and a N-PDCCH candidate configured with the second CCE in case that the N-PDCCH is received configured with no repetition.

11. The UE of to claim 9, wherein each of the first and second CCEs has no resource element group (REG) mapped to a corresponding CCE.

12. The UE of claim 9, wherein the N-PDCCH is rate-matched within a reference signal resource on the RB.

13. A base station (BS) for transmitting a signal in narrowband internet of things (NB-IoT), the BS comprising:
  a memory; and
  at least one processor coupled with the memory and configured to:
  transmit, to a user equipment (UE), a narrowband physical downlink control channel (N-PDCCH) carrying downlink control information (DCI); and
  transmit, to the UE, a physical downlink shared channel (PDSCH) based on the DCI,
  wherein a channel bandwidth of the NB-IoT is limited to 200 kHz and comprising 1 resource block (RB) which comprises 12 subcarriers in a frequency domain,
  wherein the N-PDCCH is transmitted based on at least one of two control channel elements (CCEs) on the 1 RB,
  wherein a first CCE of the two CCEs occupies 6 subcarriers with indices from 0 to 5 among the 12 subcarriers and a second CCE of the two CCEs occupies 6 subcarriers with indices from 6 to 11 among the 12 subcarriers, and
  wherein the N-PDCCH is transmitted based on a N-PDCCH candidate configured with the two CCEs in case that the N-PDCCH is transmitted with repetition.

14. The BS of claim 13, wherein the N-PDCCH is transmitted based on a first N-PDCCH candidate configured with the first CCE or a second N-PDCCH candidate configured with the second CCE in case that the N-PDCCH is transmitted configured with no repetition.

15. The BS of claim 13, wherein each of the first and second CCEs has no resource element group (REG) mapped to a corresponding CCE.

16. The BS of claim 13, wherein the N-PDCCH is rate-matched within a reference signal resource on the RB.

* * * * *